United States Patent
Papenbroock et al.

(10) Patent No.: US 10,053,600 B2
(45) Date of Patent: Aug. 21, 2018

(54) MULTI-LAYER PRODUCT

(71) Applicant: TESA SE, Norderstedt (DE)

(72) Inventors: Marten Papenbroock, Hamburg (DE); Alexander Prenzel, Hamburg (DE)

(73) Assignee: TESA SE, Norderstedt (DE)

( * ) Notice: Subject to any disclaimer, the term of this patent is extended or adjusted under 35 U.S.C. 154(b) by 102 days.

(21) Appl. No.: 15/100,762

(22) PCT Filed: Nov. 19, 2014

(86) PCT No.: PCT/EP2014/075005
§ 371 (c)(1),
(2) Date: Jun. 1, 2016

(87) PCT Pub. No.: WO2015/082219
PCT Pub. Date: Jun. 11, 2015

(65) Prior Publication Data
US 2017/0002236 A1    Jan. 5, 2017

(30) Foreign Application Priority Data

Dec. 3, 2013 (DE) .................... 10 2013 224 774

(51) Int. Cl.

| | | |
|---|---|---|
| *C09J 151/00* | (2006.01) | |
| *C09J 7/02* | (2006.01) | |
| *C09J 133/06* | (2006.01) | |
| *C09J 151/06* | (2006.01) | |
| *C08F 220/18* | (2006.01) | |
| *B32B 27/06* | (2006.01) | |
| *B32B 37/12* | (2006.01) | |
| *C08F 279/02* | (2006.01) | |
| *C08J 9/32* | (2006.01) | |
| *C08J 9/36* | (2006.01) | |
| *C09J 7/38* | (2018.01) | |
| *C09J 7/22* | (2018.01) | |
| *C09J 7/26* | (2018.01) | |

(52) U.S. Cl.
CPC ............ *C09J 7/0246* (2013.01); *B32B 27/06* (2013.01); *B32B 37/12* (2013.01); *C08F 220/18* (2013.01); *C08F 279/02* (2013.01); *C08J 9/32* (2013.01); *C08J 9/365* (2013.01); *C09J 7/22* (2018.01); *C09J 7/26* (2018.01); *C09J 7/38* (2018.01); *C09J 133/06* (2013.01); *C09J 151/00* (2013.01); *C09J 151/06* (2013.01); *B32B 2405/00* (2013.01); *C08F 2220/1858* (2013.01); *C08F 2220/1891* (2013.01); *C08J 2203/22* (2013.01); *C08J 2333/08* (2013.01); *C09J 2201/606* (2013.01); *C09J 2205/102* (2013.01); *C09J 2400/243* (2013.01); *C09J 2433/006* (2013.01); *C09J 2451/00* (2013.01)

(58) Field of Classification Search
CPC ...... C09J 7/0246; C09J 7/0289; C09J 133/06; C09J 151/00
See application file for complete search history.

(56) References Cited

U.S. PATENT DOCUMENTS

| | | |
|---|---|---|
| 5,294,668 A | 3/1994 | Badu |
| 5,789,487 A | 8/1998 | Matyjaszewski et al. |
| 5,854,364 A | 12/1998 | Senninger et al. |
| 5,877,261 A | 3/1999 | Harder et al. |
| 5,945,491 A | 8/1999 | Matyjaszewski et al. |
| 6,255,448 B1 | 7/2001 | Grimaldi et al. |
| 6,642,298 B2 | 11/2003 | Foreman et al. |
| 2003/0125494 A1 | 7/2003 | Nesvadba et al. |
| 2010/0104864 A1 | 4/2010 | Zöllner et al. |
| 2011/0104488 A1 | 5/2011 | Müssig et al. |
| 2012/0029105 A1 | 2/2012 | Czerwonatis et al. |
| 2012/0216953 A1 | 8/2012 | Bharti et al. |

FOREIGN PATENT DOCUMENTS

| | | |
|---|---|---|
| DE | 199 49 352 A1 | 4/2000 |
| EP | 0 752 435 A2 | 1/1997 |

(Continued)

OTHER PUBLICATIONS

Mayadunne et al., "Living Polymers by the Use of Trithiocarbonates as Reversible Addition—Fragmentation Chain Transfer (RAFT) Agents: ABA Triblock Copolymers by Radical Polymerization in Two Steps", Macromolecules, vol. 33, pp. 243-245, 2000.

(Continued)

*Primary Examiner* — Jeffrey C Mullis
(74) *Attorney, Agent, or Firm* — Norris McLaughlin & Marcus P.A.

(57) ABSTRACT

Multilayer product comprising at least one layer of an acrylate-based foam carrier (S); and a multiphase polymer composition (P) applied to this layer; the multiphase polymer composition (P) comprising:

a comb copolymer (A) which is obtainable by polymerization of at least one (meth)acrylate monomer in the presence of at least one macromer selected from the group consisting of polymerizable ethylene-butylene, ethylene-propylene, ethylene-butylene-propylene and isobutylene macromers, and which forms a continuous acrylate phase and a discontinuous hydrocarbon phase Kw;

and at least one hydrocarbon component (B) which is soluble in the hydrocarbon phase Kw of the comb copolymer (A) and comprises at least one plasticizer resin and at least one solid resin;

the multiphase polymer composition (P) having a continuous acrylate phase with a static glass transition temperature Tg(Ac), measured by the DSC method, and a discontinuous hydrocarbon phase Kw1, comprising the hydrocarbon component (B) and having a static glass transition temperature Tg(Kw1), measured by the DSC method, where Tg(Kw1) is higher than Tg(Ac) by 35 to 60 kelvins.

17 Claims, 2 Drawing Sheets

(56) References Cited

FOREIGN PATENT DOCUMENTS

| | | |
|---|---|---|
| EP | 1 978 069 A1 | 10/2008 |
| EP | 2 226 369 A1 | 9/2010 |
| EP | 2 316 900 A1 | 5/2011 |
| EP | 2 757 135 A1 | 7/2014 |
| WO | 96/24620 A1 | 8/1996 |
| WO | 98/01478 A1 | 1/1998 |
| WO | 98/44008 A1 | 10/1998 |
| WO | 99/31144 A1 | 6/1999 |
| WO | 2010/112346 A1 | 10/2010 |

OTHER PUBLICATIONS

International Search Report dated Feb. 13, 2015, dated Feb. 24, 2015.
English translation of International Search Report dated Feb. 13, 2015, mailed Feb. 24, 2015.

MULTI-LAYER PRODUCT

This is a 371 of PCT/EP2014/075005 filed Nov. 19, 2014, which claims foreign priority benefit under 35 U.S.C. 119 of German Patent Application 10 2013 224 774.5 filed Dec. 3, 2013, the entire contents of which are incorporated herein by reference.

The present invention relates to a multilayer product comprising at least one layer of an acrylate-based foam carrier (S); and a multiphase polymer composition (P) applied to this layer. The multiphase polymer composition comprises a comb copolymer (A), which forms a continuous acrylate phase and a discontinuous hydrocarbon phase, and also at least one hydrocarbon component (B) which is soluble in the hydrocarbon phase of the comb copolymer (A). The present invention relates further to adhesive tapes comprising the multilayer product of the invention, and also to the use of the multilayer product for adhesive bonding of articles, more particular for adhesive bonding of articles having non-polar surfaces. Likewise described is a method for producing the multilayer product.

BACKGROUND OF THE INVENTION

Pressure-sensitively adhesive products based on acrylates are known from the prior art. Their chemicals resistance makes acrylate-based adhesives especially suitable for bonding in industrial applications. A disadvantage of the known compositions, however, is that their use on substrates having surfaces of low energy ("low surface energy" materials, also LSE materials hereinafter) is difficult. This difficulty is manifested on the one hand in the bond strength of the known pressure-sensitive adhesives (PSAs) on non-polar substrates such as polypropylene or such as steel coated with LSE varnish, and also, on the other hand, in the speed with which the maximum bond strengths are achieved. The principal cause of the low bond strengths of known acrylate-based PSAs on non-polar surfaces is considered to be the difference in the surface energies of the known polymer compositions and the LSE materials, and also the absence of suitable points of attachment within the LSE surfaces for covalent or strongly non-covalent bonds. Accordingly, the adhesion between known acrylate-based polymer compositions and LSE surfaces is based essentially on relatively weak van-der-Waals forces.

One approach to the development of higher bond strengths between LSE surfaces and polymer compositions based on polyacrylates lies in the use of tackifier resins. Another approach uses primers, i.e. adhesion promoters, in order to raise the surface energy of the LSE substrates. While the use of primers is fundamentally costly and inconvenient, the use of tackifier resins leads to a decrease in the cohesion of the polymer composition, possibly leading in turn to fracture of the bond under load. Such loss of cohesion is especially critical when the polymer composition in question is used for the bonding of articles which are subject to particular forces, such as vibrations, for example. Corresponding vibrations are observed with components in the automotive sector, particularly in the area of the body or in the engine compartment.

Numerous new developments in the area of paints and varnishes on which temporary or permanent attachment of adhesive tapes is required are producing a desire, particularly in the automotive sector, for adhesive tapes which have good bond strengths even on non-polar surfaces, without any compromises on cohesion having to be accepted. Such PSAs ought, moreover, to exhibit good chemicals resistance and to develop high bond strengths after just a short time. Adhesive tapes furnished with such PSAs ought, furthermore, to have a low weight, in order to take account of the rising requirements for low fuel consumption in the motor vehicle sector. In order to reduce the volume weight of adhesive tapes, acrylate-based foam carriers have been proposed in the past.

One example of an adhesive tape including a layer of an acrylate-based foam carrier of this kind is described in EP 2 226 369 A1. The adhesive tape described therein, however, comprises a PSA based on a chemically crosslinked rubber, and therefore the resistance towards chemicals such as petroleum spirit, for example, is not adequately ensured.

While the use of acrylate-based adhesives would increase the chemicals resistance by comparison with rubber-based adhesives, simply switching the rubber PSA for an acrylate-based PSA carries the likelihood of the above-described problems on LSE materials. Using tackifier resins to improve the bond strengths of the acrylate-based PSAs, however, is not appropriate particularly in the automobile sector, on account of the above-described vibrations. Over time, moreover, it would be likely that the tackifying resin used would migrate from the PSA into the acrylate-based foam carrier layer, leading to an additional loss in the bond strengths over time. The alternative approach known from the prior art, i.e. the use of primers, is likewise out of the question for practical reasons on surface areas of motor vehicles.

Against this background there is a fundamental demand for multilayer products which exhibit good bond strengths on non-polar surfaces without any need to accept compromises in terms of cohesion. Multilayer products ought further to exhibit good chemicals resistance, develop high bond strengths after just a short time, possess a low weight, and retain the high bond strengths over long periods.

The present invention is based on the object, accordingly, of providing an improved multilayer product.

SUMMARY OF THE INVENTION

The present invention addresses this object and the problems of the prior art by providing a multilayer product comprising:
  at least one layer of an acrylate-based foam carrier (S); and
  a multiphase polymer composition (P) applied to this layer;
the multiphase polymer composition (P) comprising:
  a comb copolymer (A) which is obtainable by polymerization of at least one (meth)acrylate monomer in the presence of at least one macromer selected from the group consisting of polymerizable ethylene-butylene, ethylene-propylene, ethylene-butylene-propylene and isobutylene macromers, and which forms a continuous acrylate phase and a discontinuous hydrocarbon phase Kw;
  and at least one hydrocarbon component (B) which is soluble in the hydrocarbon phase of the comb copolymer (A) and comprises at least one plasticizer resin and at least one solid resin;
the multiphase polymer composition (P) having a continuous acrylate phase with a static glass transition temperature Tg(Ac), measured by the DSC method, and a discontinuous hydrocarbon phase Kw1, comprising the hydrocarbon component (B) and having a static glass transition temperature Tg(Kw1), measured by the DSC method, where Tg(Kw1) is higher than Tg(Ac) by 35 to 60 kelvins, preferably by 40 to 60 kelvins, more preferably by 45 to 60 kelvins.

The static glass transition temperature of the discontinuous hydrocarbon phase within the polymer composition (P), Tg(Kw1), is preferably in a range from −5 to +15° C., more preferably 0 to +10° C. The static glass transition temperature of the continuous acrylate phase within the polymer composition (P), Tg(Ac), is preferably below −10° C., more preferably in a range from −60 to −20° C., very preferably in a range from −50 to −30° C.

The present invention further relates to methods for producing a multilayer product, comprising the steps of
  (i) providing a layer of an acrylate-based foam carrier (S) having a top side and a bottom side; and
  (ii) applying a multiphase polymer composition (P) to the top side and/or bottom side of the foam carrier (S),
the multiphase polymer composition (P) comprising:
  a comb copolymer (A) which is obtainable by polymerization of at least one (meth)acrylate monomer in the presence of at least one macromer selected from the group consisting of polymerizable ethylene-butylene, ethylene-propylene, ethylene-butylene-propylene and isobutylene macromers, and which forms a continuous acrylate phase and a discontinuous hydrocarbon phase Kw;
  and at least one hydrocarbon component (B) which is soluble in the hydrocarbon phase of the comb copolymer (A) and comprises at least one plasticizer resin and at least one solid resin;
the multiphase polymer composition (P) having a continuous acrylate phase with a static glass transition temperature Tg(Ac), measured by the DSC method, and a discontinuous hydrocarbon phase Kw1, comprising the hydrocarbon component (B) and having a static glass transition temperature Tg(Kw1), measured by the DSC method, where Tg(Kw1) is higher than Tg(Ac) by 35 to 60 kelvins, preferably by 40 to 60 kelvins, more preferably still by 45 to 60 kelvins.

The herein-described comb copolymer (A) of the multiphase polymer composition (P) forms a continuous acrylate phase and a discontinuous hydrocarbon phase as soon as a multiplicity of polymer chains of individual comb copolymer molecules come into contact with one another, such as after removal of a solvent, for example. The association here between the acrylate main chains and the hydrocarbon side chains is such that a continuous acrylate phase and a discontinuous hydrocarbon phase come about.

The multiphase polymer composition (P) has at least two phases: at least one hydrocarbon phase, and an acrylate phase. The presence of these phases is evident from a determination by DSC of the static glass transition temperatures of the polymer composition. As an alternative or in addition to this, the presence of the different phases may be verified by means of Dynamic Mechanical Analysis (DMA) in accordance with ASTM D4065-12. Here, in a temperature sweep measurement, two or more glass transitions arising from the individual constituents of the composition are measured.

The continuous acrylate phase of the polymer composition (P) has a static glass transition temperature Tg(Ac), measured by the DSC method (measurement method A-4). The discontinuous hydrocarbon phase Kw1 has a static glass transition temperature Tg(Kw1), measured by the DSC method (measurement method A-4). The static glass transition temperatures of the polymer composition Tg(Kw) and Tg(Ac) differ by 35 to 60 kelvins, preferably by 40 to 60 kelvins, more preferably by 45 to 60 kelvins, with Tg(Kw1) being greater than Tg(Ac).

On account of the particular combination of the comb copolymer (A) and of the hydrocarbon component (B) which is soluble in the hydrocarbon phase Kw of the comb copolymer (A), the composition is stable in spite of the different phases—in other words, there is no macroscopic phase separation into the comb copolymer (A) on the one hand and the hydrocarbon component (B) on the other.

The multiphase polymer composition (P) has proved to be particularly suitable in the adhesive bonding of articles having LSE surfaces. It is, moreover, chemicals-resistant and UV-stable and exhibits high cohesion both at room temperature (25° C.) and at high temperatures, a feature manifested in high shear strengths. Nevertheless, surprisingly, the polymer composition (P) ensures rapid flow onto surfaces of low-energy articles and surfaces coated with LSE varnishes, and also to other LSE materials, allowing the development of high bond strengths after a short time. The multiphase polymer composition (P) further allows the provision of transparent PSA layers.

In a further aspect, accordingly, the present invention relates to an adhesive tape comprising the multilayer product described herein. Also described, therefore, is the provision of a multilayer product which is an adhesive tape. The polymer composition (P) is preferably a PSA, more preferably a transparent PSA. Further described is the use of the multilayer product for adhesive bonding of articles, more particularly for the adhesive bonding of articles having low surface energies (LSE materials). Such LSE materials include, for the purposes of the present invention, materials which really are not LSE materials, but whose surfaces behave like LSE materials with respect to adhesives on account of a coating, with a coat of an LSE varnish, for example.

DETAILED DESCRIPTION

The object described above is achieved in accordance with the invention by a multilayer product comprising
  at least one layer of an acrylate-based foam carrier (S); and
  a multiphase polymer composition (P) applied to this layer;
the multiphase polymer composition (P) comprising:
  a comb copolymer (A) which is obtainable by polymerization of at least one (meth)acrylate monomer in the presence of at least one macromer selected from the group consisting of polymerizable ethylene-butylene, ethylene-propylene, ethylene-butylene-propylene and isobutylene macromers, and which forms a continuous acrylate phase and a discontinuous hydrocarbon phase Kw;
  and at least one hydrocarbon component (B) which is soluble in the hydrocarbon phase Kw of the comb copolymer (A) and comprises at least one plasticizer resin and at least one solid resin;
the multiphase polymer composition (P) having a continuous acrylate phase with a static glass transition temperature Tg(Ac), measured by the DSC method, and a discontinuous hydrocarbon phase Kw1, comprising the hydrocarbon component (B) and having a static glass transition temperature Tg(Kw1), measured by the DSC method, where Tg(Kw1) is higher than Tg(Ac) by 35 to 60 kelvins, preferably by 40 to 60 kelvins, more preferably by 45 to 60 kelvins.

In one preferred embodiment, the polymer composition described herein is characterized in that the static glass transition temperature of the discontinuous hydrocarbon phase within the polymer composition, Tg(Kw1), is in a range from −5 to +15° C., preferably 0 to +10° C. Likewise preferably, the static glass transition temperature of the continuous acrylate phase within the polymer composition, Tg(Ac), is below −10° C., preferably in a range from −60 to −20° C., more preferably in a range from −50 to −30° C.

Suitable polymer compositions are obtainable by first providing a comb copolymer (A) whose polymer backbone (also referred to hereinafter as "backbone", "polymer main chain" or "main chain") consists to an extent of at least 20 weight percent, based on the total weight of the polymer backbone, preferably at least 50 weight percent, more preferably at least 80 to 100 weight percent, of acrylate monomer units. For this purpose, in accordance with the invention, the at least one, preferably at least two, more preferably at least three (meth)acrylate monomer(s) is (are) polymerized in the presence of the at least one macromer selected from the group consisting of polymerizable ethylene-butylene, ethylene-propylene, ethylene-butylene-propylene and isobutylene macromers.

The at least one (meth)acrylate monomer which is used for preparing the comb copolymer (A) may be a monomer mixture of two or more, more preferably of three or four, (meth)acrylate monomers, and preferably comprises at least one monomer selected from the group consisting of acrylic acid, methacrylic acid, 2-ethylhexyl acrylate, methyl acrylate, butyl acrylate, isobornyl acrylate, stearyl acrylate, isostearyl acrylate, amyl acrylate, isooctyl acrylate, decyl acrylate, hydroxyethyl acrylate, hydroxyethyl methacrylate and 4-hydroxybutyl acrylate, preferably from the group consisting of acrylic acid, methacrylic acid, 2-ethylhexyl acrylate, methyl acrylate, butyl acrylate, isobornyl acrylate, stearyl acrylate, isostearyl acrylate, amyl acrylate, isooctyl acrylate and decyl acrylate.

In one preferred embodiment of the invention, the polymerization of the at least one (meth)acrylate monomer or of the monomer mixture of two or more (meth)acrylate monomers ("monomer mixture" hereinbelow) which is or are used for preparing the comb copolymer takes place in the presence of at least one further copolymerizable monomer. This further copolymerizable monomer is preferably selected from the group consisting of itaconic acid, itaconic anhydride, maleic acid, maleic anhydride, vinyl acetate, vinyl butyrate, vinyl propionate, vinyl isobutyrate, vinyl valerate, vinyl versatates, N-vinylpyrrolidone and N-vinylcaprolactam.

Likewise preferably, the polymerization of the at least one (meth)acrylate monomer or of the monomer mixture which is used for preparing the comb copolymer is carried out in the presence of a further, second macromer. This additional, second macromer is a non-polyolefinic macromer, preferably selected from polymethacrylates, polystyrenes, polydimethylsiloxanes, polyethylene oxides and polypropylene oxides.

The polymer composition (P) comprises, in addition to the comb copolymer (A), at least one hydrocarbon component (B) which is soluble in the hydrocarbon phase of the comb copolymer and which comprises at least one solid resin and at least one plasticizer resin. "Hydrocarbon component" means that the constituents of this component are hydrocarbons. Both the solid resin and the plasticizer resin are preferably hydrocarbon resins having a number-average molecular weight Mn of 1000 g/mol or less, measured by the GPC method. In one particularly preferred embodiment, the hydrocarbon component (B) consists of a solid resin (B-1) and a plasticizer resin (B-2).

In a further embodiment of the invention, the polymer composition (P) further comprises a hydrocarbon compound (C) whose number-average molecular weight (Mn), measured by the GPC method, is more than 1000 g/mol. In a further embodiment, the polymer composition comprises at least one additive selected from the group consisting of plasticizers, oils and resins which are soluble in the acrylate phase of the comb copolymer (A), preferably rosin esters and/or terpene-phenolic resins.

According to one aspect of the present invention, the multiphase polymer composition (P) may be prepared by a method comprising the steps of polymerizing at least one, preferably at least two, more particularly at least three, for example three or four (meth)acrylate monomer(s) in the presence of at least one macromer selected from the group consisting of polymerizable ethylene-butylene, ethylene-propylene, ethylene-butylene-propylene and isobutylene macromers, to form a comb copolymer (A) having an acrylate main chain and hydrocarbon side chains;

mixing the resulting comb copolymer (A) with at least one hydrocarbon component (B) comprising at least one plasticizer resin and at least one solid resin which is compatible with the hydrocarbon side chains of the comb copolymer (A);

and also, optionally, crosslinking reactive, functional groups.

The components of the polymer composition (P) are described in more detail below.

Comb Copolymer (A)

Comb copolymers (or comb-type graft copolymers) are polymers with a construction characteristic in that on their main chain (polymer backbone) they carry side chains which by virtue of their length might already be considered to be polymeric.

As used herein, the comb copolymer (A) is intended to stand for a copolymer which more particularly is obtainable by free radical polymerization of at least one (meth)acrylate monomer or of a monomer mixture in the presence of at least one macromer selected from the group consisting of polymerizable ethylene-butylene, ethylene-propylene, ethylene-butylene-propylene and isobutylene macromers.

(Meth)acrylate Monomer

The comb copolymer (A) of the polymer composition (P) is preparable by polymerization of the at least one (meth) acrylate monomer or of a monomer mixture of two or more, for example three or four, (meth)acrylate monomers in the presence of the at least one macromer. Further copolymerizable monomers may also take part in the polymerization. The at least one (meth)acrylate monomer or the monomer mixture comprising the at least one (meth)acrylate monomer makes up preferably 50-99, more preferably 75-95, very preferably 85-90 weight percent of all constituents participating in the polymerization, i.e. all constituents leading to the comb copolymer (A), i.e. all copolymerizable monomers, macromers, including the at least one (meth)acrylate monomer. The macromer is present preferably in a fraction of 1-50, more preferably 5-25, very preferably 10-15 weight percent, based on all constituents participating in the polymerization leading to the comb copolymer (A), i.e. based on all copolymerizable monomers and macromers, including the at least one (meth)acrylate monomer.

The at least one (meth)acrylate monomer may be a monomer mixture of two or more, more preferably of three or four, (meth)acrylate monomers, and preferably comprises at least one monomer selected from the group consisting of acrylic acid, methacrylic acid, 2-ethylhexyl acrylate, methyl acrylate, butyl acrylate, isobornyl acrylate, stearyl acrylate, isostearyl acrylate, amyl acrylate, isooctyl acrylate, decyl acrylate, hydroxyethyl acrylate, hydroxyethyl methacrylate and 4-hydroxybutyl acrylate, preferably at least one monomer selected from the group consisting of acrylic acid, methacrylic acid, 2-ethylhexyl acrylate, methyl acrylate, butyl acrylate, isobornyl acrylate, stearyl acrylate, isostearyl acrylate, amyl acrylate, isooctyl acrylate and decyl acrylate.

In one preferred embodiment of the invention, the polymerization of the at least one (meth)acrylate monomer or of the monomer mixture of two or more (meth)acrylate monomers ("monomer mixture" hereinbelow) takes place in the presence of at least one further copolymerizable monomer. This further copolymerizable monomer is preferably selected from the group consisting of itaconic acid, itaconic anhydride, maleic acid, maleic anhydride, vinyl acetate, vinyl butyrate, vinyl propionate, vinyl isobutyrate, vinyl valerate, vinyl versatates, N-vinylpyrrolidone and N-vinylcaprolactam.

The at least one (meth)acrylate monomer which—as described herein—may be polymerized to form the comb copolymer (A) by polymerization in the presence of the at least one macromer is preferably selected such that the continuous acrylate phase of the multiphase polymer composition of the invention has a static glass transition temperature, Tg(Ac), of less than −10° C., preferably in a range from −60° C. to −20° C., more preferably in a range from −50 to −30° C. Employed preferably for this purpose is at least one, more preferably at least two, monomers known as low-Tg (meth)acrylate monomers, whose homopolymers have a static glass transition temperature (Tg), measured by the DSC method (measurement method A4), of 40° C. or less, preferably 25° C. or less. "Low-Tg" monomers of this kind are described in J. Brandrup, E. H. Immergut, E. A. Grulke, Polymer Handbook, 4th Edition, 1998. In one preferred embodiment, the at least one (meth)acrylate monomer comprises at least one (meth)acrylate monomer having a C1-C18 alkyl radical in the ester group, preferably butyl acrylate, amyl acrylate, 2-ethylhexyl acrylate, isooctyl acrylate and decyl acrylate.

The at least one (meth)acrylate monomer or, in the case of a mixture of two or more (meth)acrylate monomers, the monomer mixture comprising these (meth)acrylate monomers is therefore preferably a low-Tg monomer or a mixture of such monomers. This low-Tg monomer or mixture is present preferably in a fraction of 43-97 weight percent, based on all constituents participating in the polymerization that leads to the comb copolymer (A). In this preferred embodiment, the polymerization of the at least one (meth) acrylate monomer takes place advantageously in the presence of acrylic acid, methacrylic acid, itaconic acid, itaconic anhydride, maleic acid, maleic anhydride and/or of a further, so-called high-Tg monomer, whose homopolymers have a static glass transition temperature (Tg), measured by the DSC method (measurement method A4), of more than 40° C., preferably more than 80° C. "High-Tg" monomers of this kind are described in J. Brandrup, E. H. Immergut, E. A. Grulke, Polymer Handbook, 4th Edition, 1998. Acrylic acid, methacrylic acid, itaconic acid, itaconic anhydride, maleic acid, maleic anhydride and/or the other high-Tg monomer or monomers are present preferably in a fraction of 2-7, more preferably in a fraction of 2-6, very preferably in a fraction of 3-5 weight percent, based on the total weight of all constituents participating in the polymerization, i.e. all monomers and macromers.

In one preferred embodiment of the invention, therefore, the comb copolymer (A) is obtainable by polymerization of at least one (meth)acrylate monomer or of a monomer mixture of two or more (meth)acrylate monomers, these (meth)acrylate monomers being low-Tg monomers, in the presence of 2-7 weight percent, based on the total weight of all constituents participating in the polymerization, of at least one monomer which is selected from the group consisting of acrylic acid, methacrylic acid, itaconic acid, itaconic anhydride, maleic acid and maleic anhydride.

In other words, participants in the polymerization leading to the comb copolymer (A), besides the at least one macromer, are preferably at least three monomers, of which one is selected from the group consisting of acrylic acid, methacrylic acid, itaconic acid, itaconic anhydride, maleic acid, maleic anhydride and further monomers whose homopolymers have a static glass transition temperature (Tg), measured by the DSC method, of more than 40° C., preferably more than 80° C. (also referred to herein as "high-Tg" monomer). As used herein, the expression "high-Tg" monomer is based on the static glass transition temperature of the homopolymers as described in J. Brandrup, E. H. Immergut, E. A. Grulke, Polymer Handbook, 4th Edition, 1998. Participating preferably in the polymerization that leads to the comb copolymer (A) (hereinafter also "polymerization"), therefore, is only one of these high-Tg comonomers, more preferably acrylic acid or methacrylic acid, preferably acrylic acid. In accordance with the invention, this high-Tg comonomer is used preferably in an amount of 2-7 weight percent, based on the total weight of all constituents participating in the polymerization, preferably in an amount of 2-6, more preferably in an amount of 3-5 weight percent.

In one embodiment the polymerization takes place in the presence of up to 20 weight percent, preferably up to 15 weight percent (based on the total weight of all constituents participating in the polymerization), of at least one further copolymerizable monomer, selected from the group consisting of isobornyl acrylate, stearyl acrylate, isostearyl acrylate, hydroxyethyl acrylate, hydroxyethyl methacrylate, 4-hydroxybutyl acrylate, vinyl acetate, vinyl butyrate, vinyl propionate, vinyl isobutyrate, vinyl valerate, vinyl versatate, N-vinyl pyrrolidone and N-vinylcaprolactam, preferably selected from isobornyl acrylate, stearyl acrylate, isostearyl acrylate, vinyl acetate, vinyl butyrate, vinyl propionate, vinyl isobutyrate, vinyl valerate, vinyl versatate, N-vinylpyrrolidone and N-vinylcaprolactam.

In one particularly preferred embodiment, no hydroxyalkyl (meth)acrylate participates in the polymerization. It is thought that the polymerization of the at least one (meth) acrylate monomer in the absence of hydroxyalkyl (meth) acrylates allows the provision of particularly advantageous comb copolymers (A).

Employed with particular preference in the polymerization are mixtures comprising acrylic acid, butyl acrylate, 2-ethylhexyl acrylate and isobornyl acrylate, more preferably acrylic acid, butyl acrylate and 2-ethylhexyl acrylate.

Exemplary preferred mixtures consist of 3-7 weight percent acrylic acid, 45-65 weight percent butyl acrylate, 20-27 weight percent 2-ethylhexyl acrylate and up to 15 weight percent isobornyl acrylate, the figures in weight percent being based on the total weight of the comonomer mixture and of the at least one macromer, i.e. on all constituents participating in the polymerization that leads to the comb copolymer (A).

Macromer

The at least one (meth)acrylate monomer is polymerized in the presence of at least one macromer to form a comb copolymer (A). Macromers are polymers of relatively low molecular mass, having a reactive, copolymerizable functional group at one or more ends of the polymer. The at least one macromer is selected from the group consisting of polymerizable ethylene-butylene, ethylene-propylene, ethylene-butylene-propylene and isobutylene macromers. The macromer main chains of these ethylene-butylene, ethylene-propylene, ethylene-butylene-propylene and isobutylene macromers are preferably fully hydrogenated. They are obtainable by means of anionic polymerization of the corresponding monomers. One known process, for example, comprises anionic polymerization to prepare hydroxyl-terminated, conjugated diene polymers of monomers such as 1,3-butadiene and/or isoprene. Suitable rubber-like monools such as Kraton® L 1203 are available from Kraton Polymers Company. In a subsequent step, the terminal hydroxyl function can be reacted to form an acryloyl or methacryloyl functionality.

In accordance with the invention, the macromer has a molecular weight of 1000 to 500 000 g/mol, preferably 2000 to about 30 000 g/mol, more preferably 2000 to 10 000 g/mol (measured by means of gel permeation chromatography (GPC), polystyrene as standard, measurement method A1). In one preferred embodiment of the invention, the macromer has a glass transition temperature as measured by the DSC method of −30° C. or less, preferably of −70° C. to −50° C. Such macromers are available commercially, from Kuraray Co., Ltd., for example. One preferred macromer is L-1253 from Kuraray Co., Ltd. Macromers as used herein are polymers of relatively low molecular mass with a functional, copolymerizable reactive group, more particularly an acrylate-functional or methacrylate-functional group, at one or more ends of the polymer.

Comb Copolymer (A)

The comb copolymer (A) is obtainable by polymerization, preferably by free radical polymerization, of the at least one (meth)acrylate monomer or of a monomer mixture comprising the (meth)acrylate monomer in the presence of the at least one macromer. Comb copolymer (A) is a comb-type copolymer which is occasionally also referred to as a "graft copolymer". The term "graft copolymer" in this context, however, is misleading in that in the present instance the comb copolymer can be formed by polymerization of comonomers of the comonomer mixture in the presence of the macromer molecules. Instead, therefore, of graft copolymerization, in which an existing polymer backbone serves as a point of attachment for chains of further monomers, the side chains of the comb copolymer (A) as used herein are introduced preferably during the polymerization of the comonomers with the copolymerizable reactive groups of the macromer, preferably with the acrylate-functional or methacrylate-functional groups of the macromer, via the macromer chains. The copolymerizable reactive groups of the macromer, accordingly, are incorporated into the polyacrylate backbone (main chain) during the actual polymerization of the comonomer mixture. The ethylene-butylene, ethylene-propylene, ethylene-butylene-propylene and/or isobutylene chains of the macromer form the side chains of the comb copolymer (A) (also referred to herein as hydrocarbon side chains of the comb copolymer (A)). On the basis of its structure, the comb copolymer (A) is also referred to as a "bottle brush" polymer. Within the polymer composition (P), this structure and the lipophilic nature of the hydrocarbon side chains result in the formation of a continuous acrylate phase and of a discontinuous hydrocarbon phase Kw of the comb copolymer (A). The hydrocarbon phase Kw is preferably in microphase-separated form. It is thought that the phase-separated, preferably microphase-separated, comb copolymer (A) unites different physical properties by virtue of the development of the continuous acrylate phase and the discontinuous hydrocarbon phase, these properties being, specifically, a rubber-like—that is, in the present case, a hydrophobic, thermoplastic—character of the side chains, with the inherently pressure-sensitively adhesive properties of the polyacrylate backbone.

The fraction of the at least one macromer is 1 to 50 weight percent, preferably 5 to 25 weight percent and more preferably 10 to 15 weight percent, based on the total weight of all constituents participating in the polymerization that leads to the comb copolymer (A).

In other words, within the comb copolymer (A), the macromer units make up 5 to 25 weight percent and preferably 10 to 15 weight percent, based on the total weight of the comb copolymer (A).

In another preferred embodiment, the polymerization is carried out in the presence of at least one further, non-polyolefinic macromer. This additional non-polyolefinic macromer is preferably selected from the group of the polymethylacrylates, polystyrenes, polydimethylsiloxanes, polyethylene oxides and polypropylene oxides. These further non-polyolefinic macromers are also copolymerizable macromers. In other words, these non-polyolefinic macromers as well preferably have a functional acrylate or methacrylate group at the end of the polymer chain of the macromer. In one embodiment of the invention, the fraction of the at least one further, non-polyolefinic macromer is up to 20, preferably up to 10, more preferably up to 5 weight percent, based on the total weight of all constituents participating in the polymerization.

Hydrocarbon Component (B)

The multiphase polymer composition (P) comprises at least one hydrocarbon component (B), in turn comprising at least one plasticizer resin and at least one solid resin which is soluble in the hydrocarbon phase of the comb copolymer (A). The expression "soluble" in this context means that not only the plasticizer resin but also the solid resin are compatible with the hydrocarbon side chains of the comb copolymer (A), and so within the polymer composition (P), a joint hydrocarbon phase Kw1 is formed that consists of the hydrocarbon side chains of the comb copolymer (A) and of the hydrocarbon component (B). The presence of this joint hydrocarbon phase may be verified by DSC methodology: if the composition consisting of comb copolymer (A) and hydrocarbon component (B) on DSC measurement differs only in the amounts of the static glass transition temperatures of the comb copolymer (A) before the addition of component (B), there is no additional phase which could have been ascertained in the sense of an additional static glass transition temperature. Instead, the hydrocarbon phase of the polymer composition is characterized by its static glass transition temperature Tg(Kw1). This means that the hydrocarbon phase Kw1 resulting from the side chains of the comb copolymer (A) and the component (B) has only one glass transition temperature, Tg(Kw1), which is different from the Tg of the pure comb copolymer (A). If (B) were not soluble in the hydrocarbon phase Kw of the comb copolymer, it would be possible to find two hydrocarbon phase Tgs—one for the hydrocarbon phase of the (pure) comb copolymer A, and one for component (B). Accordingly, the acrylate phase within the polymer composition to which the acrylate backbone of the comb copolymer (A) contributes is also amenable to determination by DSC in respect of its glass transition temperature (Tg(Ac)).

The hydrocarbon component (B) comprises preferably a solid resin (B1) and a plasticizer resin (B2), in each case having a number-average molecular weight Mn (determined by GPC, method Al) of 1000 g/mol or less. Solid resins for the purposes of the present invention are hydrocarbon resins having a softening point of at least 70° C., preferably 70 to 150° C., more preferably 80 to 120° C. Plasticizer resins as used herein are hydrocarbon resins having a softening point of not more than 20° C. The respective softening points of solid and plasticizer resins are ring&ball softening points (measured according to ASTM E28-99).

The hydrocarbon resins (B-1) and (B-2) are preferably in a weight ratio, (B-1):(B-2), of 41:59 to 70:30. In one particularly preferred embodiment of the invention, the fraction of hydrocarbon resin (B-1) having a softening point of at least 70° C. is between 41 and 70 weight percent, more preferably between 50 and 60 weight percent, based on the total amount of all hydrocarbon resins in the multiphase polymer composition.

Suitable solid resins are petroleum-based synthetic hydrocarbons. Examples include resins based on aliphatic olefins. Such resins are available from Cray Valley under the Wingtack® 95 name, from Exxon under the Escorez® trade name, from Arakawa Chemical under the Arkon® (P series) trade name, from Hercules Speciality Chemicals under the Regalrez® (1030, 2000 and 5000 series) trade name and under the Regalite® (R series) name, and from Yasuhara Yushi Kogyo Company under the Clearon® trade name.

Suitable plasticizer resins are the C5 resin Wingtack® 10 from Cray Valley, the polyterpene resin Dercolyte® LTG and the fully hydrogenated hydrocarbon resins Regalite® 1010 and Piccotac® 1020.

In another embodiment of the invention, the fraction of the at least one hydrocarbon component (B), soluble in the hydrocarbon phase of the comb copolymer (A), in the hydrocarbon phase of the polymer composition, whose Tg, Tg(Kw1), can be determined by DSC, is at least 80 weight percent, based on the weight fraction of the hydrocarbon phase in the polymer composition, i.e. based on the amount of hydrocarbon side chains of the comb copolymer (A) and of the hydrocarbon component (B).

It has emerged, surprisingly, that the hydrocarbon resins (B-1) and (B-2) are suitable for the provision of particularly advantageous polymer compositions (P) if (B-1) and (B-2) are present in a fraction of 36 to 70 parts by weight, preferably 40 to 55 parts by weight, based on 100 parts by weight of the polymer composition (P). In the case of high fractions of the hydrocarbon compound (B-2) in the polymer composition (P), an additional hydrocarbon phase Kw2 may be formed, present additionally to the hydrocarbon phase Kw1. One possible explanation for this is that the plasticizer resin (B-2) is added in an amount that exceeds the solubility limit of the hydrocarbon compound (B-2) within the hydrocarbon phase of the comb copolymer (A). This additional hydrocarbon phase may be detected, for example, by dynamic mechanical analysis (DMA) in accordance with ASTM D4065-12.

Additives and Tackifier Resins

Besides the comb copolymer (A) and the hydrocarbon component (B) comprising at least one plasticizer resin and at least one solid resin, the polymer composition may comprise at least one additive and/or tackifier resin. Additives as used herein comprise plasticizers, oils, and resins which are soluble in the acrylate phase of the comb copolymer (A), preferably rosin esters and/or terpene-phenolic resins. Preferred rosin esters are hydrogenated rosin esters. Preferred terpene-phenolic resins are ageing-resistant terpene-phenolic resins.

Likewise possible is the addition of one or more tackifier resins different from the constituents of the hydrocarbon component (B). Using suitable tackifier resins such as indene-coumarone resins, for example, allows the static glass transition temperature of the hydrocarbon phase in the polymer composition, Tg(Kw1), to be fine-tuned. Where present, the additives and tackifier resins are preferably in an amount of up to 20 parts by weight, more preferably of up to 5 parts by weight, based on 100 parts by weight of the polymer composition (P). It has emerged, however, that the multiphase polymer composition (P) develops satisfactory bond strengths with respect to surfaces of LSE materials even without addition of tackifier resins, and in particular without addition of resins which are soluble in the acrylate phase of the comb copolymer (A). Accordingly, the multilayer product of the invention ensures durably high bond strengths to surfaces of LSE materials even without the use of such resins. The multilayer products of the invention permit durable adhesive bonds, moreover, in the event of any migration of resins (where present) soluble in the acrylate phase from the multiphase polymer composition (P) into the layer of the acrylate-based foam carrier (S), without this leading to a significant loss in the bond strength over time. The reason is that the polymer composition (P) already, inherently, develops satisfactory bond strengths with respect to surfaces of LSE materials.

In a further preferred embodiment, the polymer composition comprises an additional hydrocarbon compound (C), whose number-average molecular weight (Mn) is more than 1000 g/mol. This additional hydrocarbon compound (C) is preferably a further plasticizer resin. In particular, the plasticizer resin and the solid resin of the polymer composition (P) each have a number-average molecular weight Mn of 1000 g/mol or less, and the polymer composition (P) comprises an additional hydrocarbon compound (C) whose number-average molecular weight Mn, measured by the GPC method, is more than 1000 g/mol. In one particular embodiment of the invention, the hydrocarbon compound (C) forms a discontinuous phase within the acrylate phase of the polymer composition. In this particular embodiment, in other words, there are two different discontinuous phases within the continuous phase of the polymer composition. In accordance with this embodiment, the static glass transition temperature of this additional phase within the polymer composition, Tg(C), lies between the glass transition temperatures Tg(Kw1) and Tg(Ac) of the polymer composition.

It is possible, furthermore, to use ageing inhibitors, light stabilizers and ozone protectants as additives. Ageing inhibitors used may be Irganox® products from BASF or Hostanox® from Clariant, preferably primary inhibitors, examples being 4-methoxyphenol or Irganox® 1076, and secondary ageing inhibitors, examples being Irgafos® TNPP or Irgafos® 168 from BASF, including in combination with one another. Other suitable ageing inhibitors are phenothiazine (C radial scavenger) and also hydroquinone methyl ether in the presence of oxygen, and oxygen itself. Light stabilizers used may be UV absorbers (Cyasorb® series) or sterically hindered amines (Tinuvin® series).

In one preferred embodiment of the invention, the comb copolymer (A) or the multiphase polymer composition (P) is crosslinked. Contemplated as possible crosslinkers, with which, for example, hydroxy-, acid anhydride- or caprolactam-functional groups within the acrylate phase of the comb copolymer may be used for boosting the cohesion of the polymer composition (P), include, in particular, chemical crosslinking agents which bond coordinatively or covalently. Exemplary coordinative crosslinkers are metal chelates such as aluminium chelate and titanium chelate, for example. Exemplary covalent crosslinkers, which can be used in particular to boost the high-temperature shear strength, are isocyanates, epoxides, aziridines, carbodiimides and oxazolines. For the purposes of the present invention, crosslinkers are used preferably in an amount of about 0.02 to about 2 weight percent, based on the total weight of the comb copolymer (A).

Processes for Preparing the Multiphase Polymer Composition (P)

The polymer composition (P) may be prepared by first polymerizing the at least one (meth)acrylate monomer described herein, or a monomer mixture comprising the at least one (meth)acrylate monomer, in the presence of the at least one macromer, selected from the group consisting of polymerizable ethylene-butylene, ethylene-propylene, ethylene-butylene-propylene and isobutylene macromers, to form the comb copolymer (A). The comb copolymer (A) here may be prepared by conventional polymerization techniques familiar to the skilled person. These processes include solution, suspension, emulsion and bulk polymerization processes. The comb copolymers (A) are preferably prepared in solution by free radical polymerization. Preferred solvents and solvent mixtures ensure sufficient solubility of the macromers and are ethyl acetate, acetone, methyl isopropyl ketone, hexane and/or heptane, and also toluene, and mixtures of the stated solvents. In one preferred embodiment of the invention, the residual monomer content is reduced after the polymerization, using known methods from the prior art.

Following removal of the solvent (where present), the acrylate backbone and the hydrocarbon side chains of the comb copolymer are present in the form of a phase-separated structure, preferably a microphase-separated structure, in which the hydrocarbon phase Kw1, which is formed from the hydrocarbon side chains of the comb copolymer (A) and of the at least one hydrocarbon component (B) soluble in this hydrocarbon phase, is present discontinuously in the continuous acrylate phase of the polymer composition (P). Continuously in this context means that the acrylate phase envelops the individual sections of the discontinuous hydrocarbon phase (also called domains) like a matrix. The presence of a microphase-separated structure is manifested in the form of a transparent appearance to the polymer composition (P). In such a polymer composition, the domains of the hydrocarbon phase have a size which is below the wavelength of visible light (390-780 nm).

Pressure-Sensitive Adhesive

The present invention further relates to multilayer products wherein the polymer composition (P) is in the form of a pressure-sensitive adhesive (PSA). Surprisingly it has been found that the polymer composition (P) in the form of PSAs is particularly suitable for the bonding of substrates to non-polar surfaces. The PSAs of the present invention are, however, still suitable for bonding polar surfaces. Non-polar surfaces are substrates having a low surface energy or low surface tension, in particular having a surface tension of less than 45 mN/m, preferably of less than 40 mN/m and more preferably of less than 35 mN/m. The surface tension is determined by measurement of the contact angle to DIN EN 828.

The polymer composition (P) is provided preferably in film form, more preferably as an adhesive tape. For this purpose, the multiphase polymer composition, either as such or after addition of tackifier resins, may be shaped by conventional coating techniques from solution to form a layer on a carrier material (film, foam, syntactic foam, fabric, paper), the layer of PSA having a weight per unit area of 40 to 100 g/m². With particular preference the multiphase polymer composition (P) is applied directly to the acrylate-based foam carrier (S).

The acrylate-based foam carrier (S) is described in more detail below.

Acrylate-Based Foam Carrier (S)

The multilayer product of the invention comprises at least one layer of an acrylate-based foam carrier (S). The foam carrier (S) has a top side and a bottom side. Applied to at least one of these sides is the multiphase polymer composition (P) described herein. In other words, at least one of these sides is joined to the multiphase polymer composition (P). Using the multiphase polymer composition (P) here avoids the problems of conventional acrylate-based adhesives, which for bonding to non-polar surfaces would have to be provided as a mixture with a tackifier resin. The reason for this is that even without addition of tackifier resins soluble in the acrylate phase, the polymer composition (P) develops satisfactory bond strengths with respect to surfaces of LSE materials, and retains these bond strengths even without the aforementioned tackifier resins. The multiphase polymer compositions (P) have also proved to be phase-stable systems in which there is no migration of constituents of the hydrocarbon component (B) into the matrix of the acrylate-based foam layer (S). Accordingly, the use of the polymer composition (P) on the layer of the acrylate-based foam carrier (S) is not accompanied by the risk of a loss of bond strength over time, after the bonding of substrates having LSE surfaces, as might be expected with typical acrylate-based adhesives, which develop their bond strengths towards LSE surfaces only through use of a resin that is soluble in the acrylate phase of the adhesive.

The at least one layer of the acrylate-based foam carrier (S) comprises at least one acrylate, also referred to below as "acrylate which forms the layer of the acrylate-based foam carrier (S)" or as "the acrylate forming the layer of the acrylate-based foam carrier (S)" or as "the acrylate forming the layer of the foam carrier (S)" or as "acrylate which forms the layer of the foam carrier" or similar. This acrylate can be converted by known methods into a foam, to give an acrylate-based foam. Possible techniques include the use of expandants, mixing with expandable, pre-expanded and already fully expanded hollow spheres, or with non-expandable hollow spheres, and the introduction of gases.

In one preferred embodiment, the acrylate-based foam carrier (S) is a viscoelastic foam carrier. The acrylate-based foam carrier (S) is preferably a syntactic foam. In a syntactic foam, glass beads or hollow ceramic spheres (microspheres) or microballoons are incorporated in a polymer matrix. Accordingly, in a syntactic foam, the voids are separate from one another, and the substances present in the voids (gas, air) are separated from the surrounding matrix by a membrane. This makes the material substantially stronger than conventional foams with unreinforced gas inclusions.

In another embodiment of the invention, the acrylate forming the layer of the foam carrier (S) is a polyacrylate which is obtainable by free or controlled radical polymerization of one or more acrylates and alkyl acrylates. More preferably the acrylate which forms the layer of the foam carrier (S) is a crosslinked polyacrylate.

The acrylate-based foam carrier (S) of the multilayer product of the invention may comprise not only the polyacrylate provided in accordance with the invention but also all polymers and/or mixtures of polymers that are known to the skilled person. The foam carrier preferably consists only of polyacrylate as scaffold polymer.

The polyacrylate of the acrylate-based foam carrier (S) is obtainable preferably by a free or controlled radical polymerization of one or more (meth)acrylic acids or (meth)acrylic esters, and more preferably is crosslinked thermally, in order to prevent—particularly in the case of thick foam carrier layers—a crosslinking gradient, which may result from a photochemical crosslinking method or from electron beam crosslinking.

In one preferred embodiment of the invention, thermally crosslinkable, poly(meth)acrylate-based polymers are used for the layer of the foam carrier (S). The acrylate forming the layer of the foam carrier (S) is preferably obtainable by polymerization of monomers consisting of monomers from groups (a1), (a2) and (a3) below. "Polymerization" at this point refers to the reaction which leads to the polyacrylate particularly suitable for the formation of the layer of foam carrier (S).

(a1) 70 to 100 wt %, based on all the monomers participating in the polymerization, of acrylic esters and/or methacrylic esters and/or a free acid as per the structural formula (I):

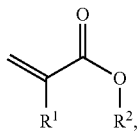

(I)

where $R^1$ is H or $CH_3$ and $R^2$ represents H or $C_1$-$C_{14}$ alkyl; "$C_1$-$C_{14}$ alkyl" refers in the present case to alkyl chains having 1 to 14 C atoms, these alkyl chains encompassing straight-chain groups, i.e. linear groups, and branched alkyl groups;

(a2) 0 to 30 wt %, based on all monomers participating in the polymerization, of olefinically unsaturated monomers which are copolymerizable with the monomers of group (a1) and have at least one functional group; preferred "functional groups" of the monomers of group (a2) are polar and/or sterically bulky groups having acid anhydride, substituted or unsubstituted aryl, aryloxyalkyl and/or alkyloxyalkyl functionalities, and also heterocyclic groups and N,N-dialkylaminoalkyl units;

(a3) optionally further acrylates and/or methacrylates and/or olefinically unsaturated monomers, preferably in a fraction of 0 to 5 wt %, preferably of more than 0 to 5 wt %, which are copolymerizable with the monomers of group (a1) and have a functional group which leads to covalent crosslinking by means of the coupling reagent.

Group (a1) monomers used are preferably acrylic monomers comprising acrylic and methacrylic esters with alkyl chains having 1 to 14 C atoms. Preferred examples are methyl acrylate, methyl methacrylate, ethyl acrylate, ethyl methacrylate, propyl acrylate, propyl methacrylate, n-butyl acrylate, n-butyl methacrylate, n-pentyl acrylate, n-hexyl acrylate, n-hexyl methacrylate, n-heptyl acrylate, n-octyl acrylate, n-nonyl acrylate, lauryl acrylate, stearyl acrylate, stearyl methacrylate, behenyl acrylate and branched isomers thereof such as 2-ethylhexyl acrylate, for example. Further examples that may preferably be used in small amounts as group (a1) monomers are cyclohexyl methacrylates, isobornyl acrylate and isobornyl methacrylates. The fraction thereof is preferably at most up to 20 wt %, more preferably at most up to 15 wt %, based in each case on the total amount of monomers (a1).

Preferably, group (a2) monomers are maleic anhydride, itaconic anhydride, glycidyl methacrylate, benzyl acrylate, benzyl methacrylate, phenyl acrylate, phenyl methacrylate, tert-butylphenyl acrylate, tert-butylphenyl methacrylate, phenoxyethyl acrylate, phenoxyethyl methacrylate, 2-butoxyethyl methacrylate, 2-butoxyethyl acrylate, dimethylaminoethyl methacrylate, dimethylaminoethyl acrylate, diethylaminoethyl methacrylate, diethylaminoethyl acrylate and tetrahydrofurfuryl acrylate, and also mixtures thereof. Also preferred for use as group (a2) monomers are aromatic vinyl compounds, where the aromatic nuclei comprise preferably $C_4$ to $C_{18}$ groups and may also contain heteroatoms. Particularly preferred examples of such are styrene, 4-vinylpyridine, N-vinylphthalimide, methylstyrene and 3,4-dimethoxystyrene monomers.

Preferred group (a3) monomers are hydroxyethyl acrylate, 3-hydroxypropyl acrylate, hydroxyethyl methacrylate, 3-hydroxypropyl methacrylate, 4-hydroxybutyl acrylate, 4-hydroxybutyl methacrylate, allyl alcohol, itaconic acid, acrylamide and cyanoethyl methacrylate, cyanoethyl acrylate, 6-hydroxyhexyl methacrylate, N-tert-butylacrylamide, N-methylolmethacrylamide, N-(butoxymethyl)methacrylamide, N-methylolacrylamide, N-(ethoxymethyl)acrylamide, N-isopropylacrylamide, vinylacetic acid, β-acryloyloxypropionic acid, trichloroacrylic acid, fumaric acid, crotonic acid, aconitic acid, dimethylacrylic acid and 4-vinylbenzoic acid, and also mixtures thereof.

Particularly preferred monomers of group (a3) may advantageously also be selected such that they include functional groups which support subsequent chemical radiation crosslinking (for example by electron beams or UV). Suitable copolymerizable photoinitiators are, for example, benzoin acrylate and acrylate-functionalized benzophenone derivatives. Monomers which support crosslinking by electron beam bombardment are, for example, tetrahydrofurfuryl acrylate, N-tert-butylacrylamide and allyl acrylate, this enumeration not being conclusive.

In one particularly preferred embodiment, the group (a1) to (a3) monomers are selected such that the resultant polymers thermally crosslinkable, more particularly such that the resultant polymers possess pressure-sensitive adhesive properties in accordance with the *Handbook of Pressure Sensitive Adhesive Technology* by Donatas Satas (van Nostrand, New York, 1989).

The nature of the comonomers is selected such that the glass transition temperature Tg(A) of the polymers is below the intended application temperature, and preferably 15° C. or less. To achieve this, comprising group (a1) to (a3) monomers the quantitative composition of the monomer mixture is preferably selected such that the Fox equation (E1) (cf. T. G. Fox, *Bull. Am. Phys. Soc.* 1956, 1, 123) produces the desired Tg(A) value for the polymer.

$$\frac{1}{T_G} = \sum_n \frac{w_n}{T_{G,n}} \tag{E1}$$

In this equation, n represents the serial number of the monomers used, $w_n$ represents the mass fraction of the respective monomer n (wt %), and $T_{G,n}$ represents the respective glass transition temperature of the homopolymer of the respective monomers n, in K. The determination of Tg(A) (or "Tg" as in equation E1 above) is possible by the DSC method (measurement method A4).

To produce suitable polyacrylates which can be used for the layer of the acrylate-based foam carrier (S), the monomer(s) is (are) reacted preferably by conventional radical polymerizations or controlled radical polymerizations. For the polymerizations proceeding by a radical mechanism it is preferred to use initiator systems which include further radical initiators for the polymerization, more particularly thermally decomposing radical-forming azo or peroxo initiators. In principle, however, all customary initiators familiar to the skilled person for acrylates and/or methacrylates are suitable. The production of C-centred radicals is described in Houben-Weyl, *Methoden der Organischen Chemie*, Vol. E 19a, pages 60 to 147. These techniques are preferentially employed in analogy.

Examples of radical sources are peroxides, hydroperoxides and azo compounds. A number of non-exclusive examples of typical radical initiators may be given here: potassium peroxodisulphate, dibenzoyl peroxide, cumene hydroperoxide, cyclohexanone peroxide, di-tert-butyl peroxide, azobisisobutyronitrile, cyclohexylsulphonyl acetyl peroxide, diisopropyl percarbonate, tert-butyl peroctoate, and benzopinacol. Particularly preferred for use as radical initiators are 2,2'-azobis(2-methylbutyronitrile) (Vazo® 67 from DuPont), 1,1'-azobis(cyclohexanecarbonitrile) (Vazo® 88) and bis(4-tert-butyl-cyclohexyl) peroxydicarbonate (Perkadox® 16 from AkzoNobel).

The average molecular weights $M_n$ and $M_w$ of the polyacrylates formed in the radical polymerization and useful as acrylate for the acrylate-based foam carrier (S) are very preferably selected such that they lie within a range from 20 000 to 2 000 000 g/mol; preference is given to producing acrylates, for the layers of the acrylate-based foam carriers (S), having average molecular weights $M_w$ of 200 000 to 1 200 000 g/mol. The average molecular weight is determined via gel permeation chromatography (GPC).

The polymerization may be carried out in bulk, in the presence of one or more organic solvents, in the presence of water, or in mixtures of organic solvents and water. The aim is to minimize the amount of solvent used. Suitable organic solvents are pure alkanes (for example hexane, heptane, octane, isooctane), aromatic hydrocarbons (for example benzene, toluene, xylene), esters (for example ethyl acetate or propyl, butyl or hexyl acetate), halogenated hydrocarbons (for example chlorobenzene), alkanols (for example methanol, ethanol, ethylene glycol, ethylene glycol monomethyl ether), ketones (for example acetone and butanone) and ethers (for example diethyl ether and butyl ether) or mixtures thereof. The aqueous polymerization reactions may be admixed with a water-miscible or hydrophilic co-solvent, in order to ensure that the reaction mixture is in the form of a homogeneous phase during monomer conversion. Co-solvents which can be used with advantage for the present invention are selected from the following group consisting of aliphatic alcohols, glycols, ethers, glycol ethers, pyrrolidines, N-alkyl-pyrrolidinones, N-alkylpyrrolidones, polyethylene glycols, polypropylene glycols, amides, carboxylic acids and salts thereof, esters, organic sulphides, sulphoxides, sulphones, alcohol derivatives, hydroxyether derivatives, amino alcohols, ketones and the like, and also derivatives and mixtures thereof.

The polymerization time—depending on conversion and temperature—is between four and 72 hours. The higher the reaction temperature that can be selected, in other words the higher the thermal stability of the reaction mixture, the lower it is possible to select the reaction time.

For the thermally decomposing initiators, the introduction of heat is essential in order to initiate the polymerization. For the initiators that decompose thermally, the polymerization may be initiated by heating to 50 to 160° C., depending on initiator type.

Furthermore, the use of chain transfer agents that regulate polymerization is likewise advantageous in the sense of the invention, in order thereby to be able to carry out the polymerization in a controlled way and exert an influence over the molar mass distribution.

In this context it is possible for radical stabilization, in a favourable procedure, to use nitroxides, such as, for example, 2,2,5,5-tetramethyl-1-pyrrolidinyloxyl (PROXYL), 2,2,6,6-tetramethyl-1-piperidinyloxyl (TEMPO), derivatives of PROXYL or of TEMPO, and other nitroxides familiar to the skilled person.

A series of further polymerization methods by which the acrylates suitable for the layer of the acrylate-based foam carrier (S) can be produced in alternative procedures may be selected from the prior art. Thus WO 96/24620 A1 describes a polymerization process which uses very specific radical compounds such as, for example, phosphorus-containing nitroxides which are based on imidazolidine.

WO 98/44008 A1 discloses specific nitroxyls which are based on morpholines, piperazinones and piperazinediones.

DE 199 49 352 A1 describes heterocyclic alkoxyamines as regulator agents in controlled-growth radical polymerizations.

Another controlled polymerization technique that can be employed advantageously for the synthesis of block copolymers is Atom Transfer Radical Polymerization (ATRP), using as initiator preferably monofunctional or difunctional secondary or tertiary halides and, to abstract the halide or halides, certain metal complexes. The various possibilities of ATRP are further described in the specifications of U.S. Pat. No. 5,945,491 A, of U.S. Pat. No. 5,854,364 A and of U.S. Pat. No. 5,789,487 A.

A very preferred production operation performed is a variant of RAFT polymerization (reversible addition-fragmentation chain transfer polymerization). The polymerization process is described comprehensively for example in specifications WO 98/01478 A1 and WO 99/31144 A1. Suitable with particular advantage for the preparation are trithiocarbonates of the general structure R'''—S—C(S)—S—R''' (*Macromolecules* 2000, 33, pages 243 to 245).

In one very advantageous variant, for example, the trithiocarbonates (TTC1) and (TTC2) or the thio compounds (THI1) and (THI2) are used for the polymerization, where φ may be a phenyl ring, which may be unfunctionalized or functionalized by alkyl or aryl substituents, linked directly or via ester or ether bridges, or may be a cyano group or may be a saturated or unsaturated aliphatic radical. The phenyl ring φ may optionally carry one or more polymer blocks, as for example polybutadiene, polyisoprene, polychloroprene or poly(meth)acrylate, which may have a construction as defined for P(A) or P(B), or polystyrene, to name but a few. Functionalizations may be, for example, halogens, hydroxyl groups, epoxide groups, nitrogen-containing or sulphur-containing groups, without this enumeration making any claim to completeness.

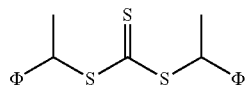

(TTC 1)

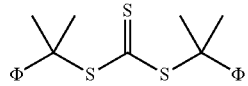

(TTC 2)

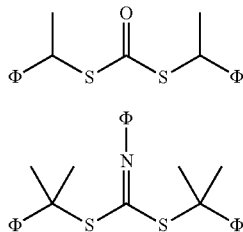

(THI 1)

(THI 2)

In conjunction with the abovementioned polymerizations that proceed by a controlled-growth radical mechanism, preference is given to initiator systems which further comprise other radical initiators for the polymerization, especially the thermally decomposing radical-forming azo or peroxo initiators already enumerated above. In principle, however, all customary initiators known for acrylates and/or methacrylates are suitable for these purposes. It is also possible, moreover, to use radical sources which liberate radicals only under UV irradiation.

The polyacrylates obtainable by the methods described, and used preferably to form the acrylate-based foam carrier (S), may be admixed with at least one tackifying resin. In accordance with one advantageous embodiment of the invention, the fraction of resins, based on the overall composition, is between 0 and 40 wt %, advantageously between 20 to 35 wt %. Tackifying resins to be added that can be used are those tackifier resins already known and described in the literature.

Reference may be made more particularly to all aliphatic, aromatic and alkylaromatic hydrocarbon resins, hydrocarbon resins based on pure monomers, hydrogenated hydrocarbon resins, functional hydrocarbon resins, and natural resins. It is possible with preference to employ α-pinene, β-pinene and δ-limonene, indene resins, rosins, their disproportionated, hydrogenated, polymerized and esterified derivatives and salts, terpene resins and terpene-phenolic resins, and also $C_5$, $C_5/C_9$, $C_9$ and other hydrocarbon resins. Combinations of these and further resins as well may be used with advantage in order to bring the properties of the resultant acrylate-based foam carrier (S) layer into line with the requirements. With particular preference it is possible to employ all resins that are compatible (soluble) with the polyacrylate of the acrylate-based foam carrier (S). One particularly preferred procedure adds terpene-phenolic resins and/or rosin esters. Aforementioned tackifier resins may be employed both alone and in a mixture.

Optionally it is also possible to use additives such as powderous and granular fillers, dyes and pigments, especially including abrasive and reinforcing products of these kinds, such as, for example, Aerosils (fumed silicas), chalks ($CaCo_3$), titanium dioxides, zinc oxides and carbon blacks, and it is possible, especially in the case of melt processing, to use them in high proportions as well, of 0.5 to 50 wt %, based on the overall formula of the composition leading to the acrylate-based foam carrier (S). Great preference may be given to using Aerosils and various forms of chalk as filler, with Mikrosohl chalk being particularly preferred for use. In preferred proportions of up to 30 wt %, there is virtually no change to the adhesives properties (shear strength at RT, instantaneous bond strength to steel and PE) of suitable acrylates as a result of the addition of filler.

Furthermore, especially in the case of bulk polymerization and of further processing from the polymer melt, it is possible for low-flammability fillers, such as ammonium polyphosphate, for example, and also electrically conductive fillers (such as conductive carbon black, carbon fibres and/or silver-coated beads, for example), and also thermally conductive materials (such as boron nitride, aluminium oxide and silicon carbide, for example), and also ferromagnetic additives (such as iron(III) oxides, for example), and also volume-increasing additives, especially for producing foamed layers and/or syntactic foams (such as blowing agents, solid glass beads, hollow glass beads, carbonized microbeads, hollow phenolic microbeads, microbeads made of other materials, expandable microballoons (Expancel® from AkzoNobel, for example), silica, silicates, renewable organic raw materials, such as sawdust, organic and/or inorganic nanoparticles, and fibres), and also ageing inhibitors, light stabilizers, ozone protectants, compounding agents and/or expandants, to be added or incorporated by compounding.

Ageing inhibitors which can be used include preferably not only primary inhibitors, as for example 4-methoxyphenol or Irganox® 1076, but also secondary inhibitors, as for example Irgafos® TNPP or Irgafos® 168 from BASF, also in combination with one another. Reference here will be made only at this point to further, corresponding Irganox® products from BASF and/or Hostanox® from Clariant. Other outstanding agents to counter ageing that may be used include phenothiazine (C-radical scavenger) and also hydroquinone methyl ether in the presence of oxygen, and also oxygen itself.

In one particularly preferred embodiment of the invention, the layer of the foam carrier (S) is foamed through use of microballoons. Such microballoons, also called expandable polymeric microbeads, are hollow elastic spheres which have a thermoplastic polymer shell; accordingly they are also referred to as expandable polymeric microspheres. These spheres are filled with low-boiling liquids or liquefied gas. Shell material used includes more particularly polyacrylonitrile, polyvinyl dichloride (PVDC), polyvinyl chloride (PVC), polyamides or polyacrylates. Suitable low-boiling liquid includes, in particular, hydrocarbons of the lower alkanes, such as isobutane or isopentane, for example, which are enclosed in the form of a liquefied gas under pressure in the polymer shell. As a result of exposure of the microballoons, more particularly through heat exposure—in particular by supply of heat or generation of heat, by means of ultrasound or microwave radiation, for example,—on the one hand there is a softening of the external polymer shell. At the same time the propellant liquid gas present within the shell undergoes transition to its gaseous state. With a particular pairing of pressure and temperature, the microballoons undergo an irreversible and three-dimensional expansion. Expansion is at an end when the internal pressure matches the external pressure. Since the polymeric shell is retained, a closed-cell foam is thus produced. In one preferred embodiment of the invention, the acrylate-based foam carrier (S) is produced prior to expansion by mixing the acrylate that forms the layer of the foam carrier with expandable polymeric microbeads.

A multiplicity of types of microballoon are available commercially, such as, for example, from Akzo Nobel, the Expancel DU (dry unexpanded) products, which differ substantially in their size (6 to 45 μm diameter in the unexpanded state) and the initiation temperature they require for expansion (75° C. to 220° C.).

Also available, furthermore, are unexpanded microballoon products in the form of an aqueous dispersion with a solids fraction or microballoon fraction of around 40 to 45 wt %, and also polymer-bound microballoons (masterbatches), for example in ethylene-vinyl acetate, with a microballoon concentration of around 65 wt %. Additionally obtainable are what are called microballoon slurry systems, where the microballoons are present with a solids fraction of 60 to 80 wt % as an aqueous dispersion. The microballoon dispersions, the microballoon slurries and the masterbatches, like the DU products, are suitable for foaming in accordance with the advantageous development of the invention.

As a result of their flexible, thermoplastic polymer shell, the foams produced with microballoons possess a greater crack-bridging capability than those filled with non-expandable, non-polymeric hollow microbeads (such as hollow glass or ceramic beads). They are therefore better suited to the compensation of manufacturing tolerances. Furthermore, a foam of this kind is better able to compensate thermal stresses.

In one embodiment of the invention, following the polymerization, the acrylate that forms the acrylate-based foam carrier may also be mixed or blended with other polymers. Suitability for this purpose is possessed by polymers based on natural rubber, synthetic rubber, vinylaromatic block copolymer, for example styrene block copolymers, EVA, silicone rubber, acrylic rubber and polyvinyl ether. The polymer blends are produced either in solution or in an extruder, preferably in a multi-screw extruder or in a planetary roller mixer, in the melt. In the case of a polymer blend, the fraction of the acrylate forming the acrylate-based foam carrier (S) is preferably at least 50 wt %, more preferably at least 55 wt %, based on the total weight of all constituents of the foam carrier (S). This ensures that the polymer composition (P) has sufficient adhesion to the acrylate-based foam carrier layer and guarantees satisfactory chemical resistance on the part of the carrier.

An optional possibility is to add the customary plasticizers (plasticizing agents), more particularly in concentrations of up to 5 wt %, to the acrylate that forms the acrylate-based foam carrier (S) layer, i.e. to the acrylate forming the acrylate-based foam carrier (S). Plasticizers used may be low molecular mass polyacrylates, phthalates, water-soluble plasticizers, plasticizing resins, phosphates, polyphosphates, adipates and/or citrates, for example.

The internal strength (cohesion) of the acrylate-based foam carrier, preferably of the viscoelastic polyacrylate foam carrier, is preferably increased by crosslinking. For this purpose it is possible optionally to add compatible crosslinker substances to the acrylate-containing compositions described above. Examples of suitable crosslinkers of the acrylate forming the acrylate-based foam carrier (S) layer include metal chelates, polyfunctional isocyanates, polyfunctional amines, polyfunctional epoxides, polyfunctional aziridines, polyfunctional oxazolines, polyfunctional carbodiimides or polyfunctional alcohols which react with functionalities that are reactive and are present in the acrylate. Polyfunctional acrylates as well can be used advantageously as crosslinkers for an actinic irradiation.

The at least one acrylate-based foam carrier (S) layer of the multilayer product of the invention has a layer thickness of preferably at least 0.3 mm, more preferably of at least 0.5 mm. A typical layer thickness range for such a foam layer is between 0.3 mm up to 5 mm, preferably from 0.5 mm up to 2 mm, even more preferably between 0.5 mm and 1.2 mm. The acrylate-based foam carrier (S) layer has a cellular membrane structure, preferably a closed-cell membrane structure, more preferably a syntactic foam structure, in which 15% to 85% of the volume is occupied by voids.

The at least one acrylate-based foam carrier (S) layer of the multilayer products of the invention manages even without tackifier resins (K), additives (Ad), including the aforementioned fillers, plasticizers (VV) or additional polymers (P), and also without K+Ad, K+W, K+P, Ad+W and the other possible two-way combinations, and additionally without K+Ad+W, K+Ad+P and the other possible three-way combinations, or without K+Ad+W+P.

Further Implementation of the Method for Producing the Acrylate-Based Foam Carrier (S) Layer The at least one acrylate-based foam carrier (S) layer of the multilayer product of the invention can be produced from solution or solventlessly from the melt. Processing from the melt is particularly preferred, since the absence of a drying step allows production of foams having particularly thick layers. For the foaming of the acrylate forming the layer of the acrylate-based foam carrier (S), customary technologies are suitable. As described above, thermal crosslinking of the viscoelastic foam is desirable, since it allows a crosslinking gradient to be avoided, in contrast to photochemical crosslinking or to electron beam curing. With particular advantage the thermal crosslinking may be accomplished in line with the thermal methods for crosslinking polyacrylate melts that are specified in EP 0 752 435 A1 and EP 1 978 069 A1, and which are therefore explicitly included in the disclosure content of the present specification. The invention is not confined thereto, however. It is also possible to use all crosslinking techniques that are familiar to the skilled person. Against this background, for the purposes of the present invention, preference is given to employing foaming technologies which do not oppose the crosslinking of the acrylate forming the layer of the acrylate-based foam carrier.

Moreover, processing from the melt is particularly preferred since it allows the foaming operation to be controlled in a targeted way, thereby permitting optimum adjustment of cell structure and also of the density of the foam carrier. The foaming operation may in particular be carried out advantageously in accordance with WO 2010/112346 A1, which is therefore explicitly included in the disclosure content of the present text. The invention, however, is not restricted thereto.

Another very advantageous embodiment of the foaming operation in the present invention is the use of expandable polymeric microbeads and the targeted suppression of foaming in the extrusion operation, that takes place only following departure from a die, through the pressure loss that is generated by such departure.

The process for suppression of foaming by expansion of such expandable polymeric microbeads in the extrusion operation is carried out preferably as follows (cf. FIGS. 1 and 2). The acrylate forming the layer of the acrylate-based foam carrier (S) is melted and conveyed, in particular by means of a conveying assembly 1, to a mixing assembly 2. In this assembly 2, and optionally in one or more further mixing assemblies 3 (suitable mixing assemblies 2, 3 are, in particular, extruders, such as twin-screw extruders and/or planetary roller extruders), further necessary components and, where appropriate, optional components are mixed in at particular metering points 22, 23, 34, 35, and 36, such as resins, accelerants, crosslinkers, fillers, and the like, and also the microballoons. If necessary, at least one of the mixing assemblies 2, 3 or a further optionally provided assembly (not shown in the figures) is suitable for degassing the polymer melt. This degassing unit is unnecessary, particularly if all of the mixture constituents have already been degassed prior to addition and the further ingress of gases has been avoided. Advantageously there is a vacuum dome V used for generating the subatmospheric pressure which produces degassing. The addition of the microballoons takes place in particular at elevated pressure, in order to suppress premature expansion of the hollow microbeads at the temperature of the polymer melt.

The melt mixture produced in this way is transferred to a die 5. On departure from the die 5, there is a drop in pressure, and so the hollow microbeads following their departure, in other words following the drop in pressure, undergo expansion and ensure the foaming of the polymer composition. The composition foamed in this way is subsequently shaped, more particularly by means of a roll mill 4, such as a roll calender.

BRIEF DESCRIPTION OF THE DRAWINGS

The process is elucidated in more detail below with reference to two figures, without any intention that the teaching according to the invention should be restricted unnecessarily by this exemplary representation. In the figures

Figure 1:
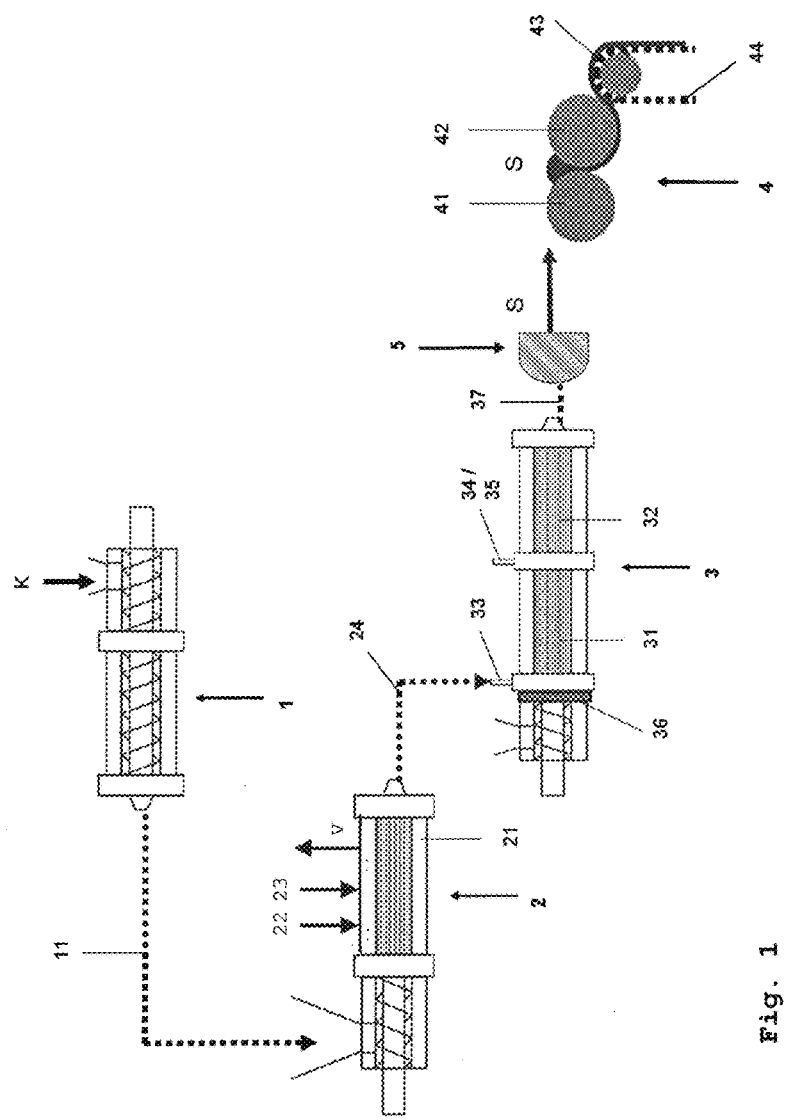
FIG. 1 shows an apparatus construction particularly useful for implementing the process, and FIG. 2 superimposed on the apparatus construction dealt with before, shows by way of example a locational assignment of the individual process steps and additionally, in particular, the parameters of temperature and pressure.

The arrangement of the assemblies and process apparatus constituents, especially of the mixing assemblies, is presented by way of example, and can be varied according to the process regime.

FIG. 1

In a first assembly 1, as for example in a conveying assembly such as an extruder (more particularly a single-screw conveying extruder), the polymer forming the layer of the acrylate-based foam carrier (S) is melted and is conveyed, in particular by means of this conveying assembly 1, as a polymer melt, via a connecting section 11, more particularly a heatable connecting section 11 (for example, a hose or a pipe), into a second assembly 2, more particularly a mixing assembly such as a twin-screw extruder.

Via one or more metering points 22, 23 in the second assembly, it is possible, jointly or separately from one another, for additives to be added to the base polymer melt, such as, for example, all the resins or some of the resins, the crosslinker system or parts thereof (more particularly crosslinker and/or accelerant), fillers, colour pastes or the like.

Prior to departure from the assembly 2, in other words in particular from the twin-screw extruder, the polymer melt thus blended is degassed, more particularly via a vacuum dome V at a pressure of 175 mbar or less, and subsequently is conveyed via a second connecting section 24, more particularly a heatable connecting section 24 (for example, a hose or a pipe), into a third assembly 3, more particularly a second mixing assembly, as for example a planetary roller extruder provided with a sliding sealing ring 36.

The third assembly 3, more particularly the planetary roller extruder, has one or more temperature-controllable mixing zones 31, 32 and one or more injection or metering facilities 33, 34, 35, for the polymer melt to be introduced and to be blended with further components and/or additives, the latter components and/or additives having more particularly already been degassed.

Via a metering point 34, for example, a resin or a resin mixture is added. Advantageously the resin or resin mixture has been degassed beforehand in a separate vacuum dome V.

Via a metering point 35 (here drawn in only schematically at the same point as 34, although it may well be—and usually is—a different metering point situated at a different point on the extruder), the microballoons embedded into a liquid are added. Via the same metering point or a further metering point, not shown in FIG. 1, the crosslinker system or parts thereof (in particular, hitherto absent components of the crosslinker system) may be added. Advantageously, the crosslinker system or parts thereof—more particularly crosslinker and/or accelerant—may be mixed in together with the microballoons, as a microballoon/crosslinker system mixture. In a heating zone 32 (heatable mixing zone), the polymer melt is compounded with the added components and/or additives, but at least with the microballoons.

The resultant melt mixture is transferred via a further connecting section or a further conveying unit 37, such as a gear pump, for example, into a die 5. On departure from the die 5, in other words after a pressure drop, the incorporated microballoons undergo expansion, so giving rise to a foamed polymer composition, more particularly a foamed self-adhesive composition, which is subsequently shaped, being shaped, for example, as a web by means of a roll calender 4 (rolls 41, 42, and 43 of the calender; carrier material 44 onto which the polymer layer is deposited).

FIG. 2

Figure 2:
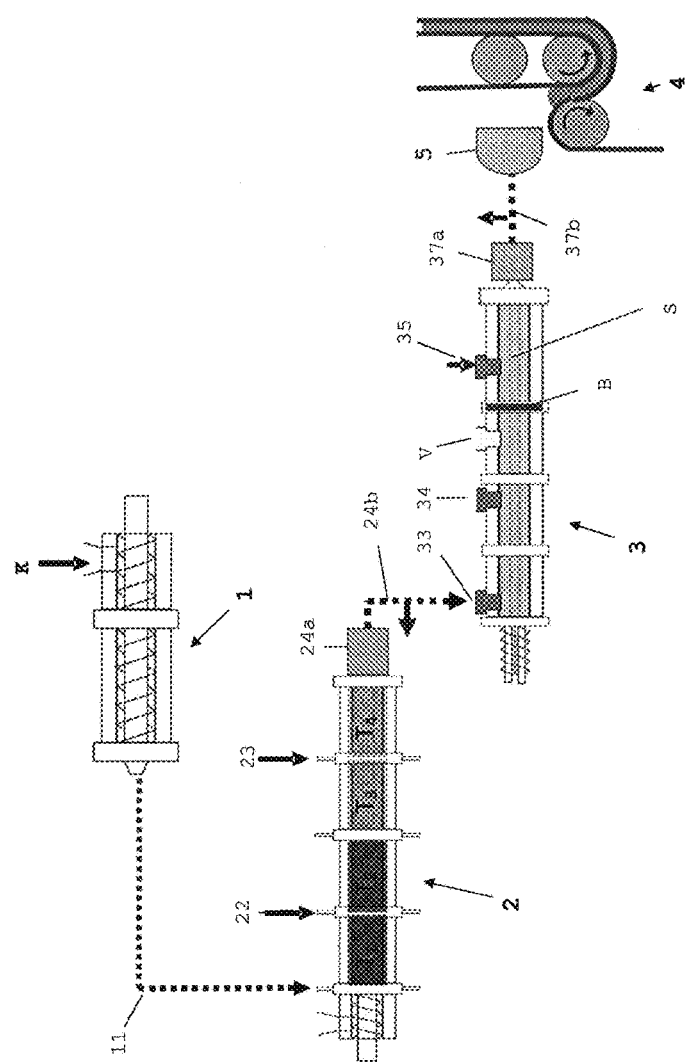

The acrylate forming the layer of the acrylate-based foam carrier (S) is melted in a first assembly 1, as for example in a conveying assembly such as an extruder (more particularly a single-screw conveying extruder), and with this assembly is conveyed in the form of a polymer melt, via a heatable hose 11 or a similar connecting section (for example, a pipe), into a second assembly 2, as for example a mixing assembly such as a planetary roller extruder. In FIG. 2, by way of example for this, a modular-construction planetary roller extruder is provided which has four modules that can be temperature-controlled independently of one another ($T_1$, $T_2$, $T_3$, $T_4$).

Via the metering port 22 it is possible for further components to be added, here in particular a melted resin or a melted resin mixture (for better miscibility, it may be advantageous to select a high temperature in the segment $T_2$, and preferably in the segment $T_1$ as well). There is also the possibility of supplying additional additives or fillers, such as colour pastes, for example, via further metering ports such as 22 present in the assembly 2 (not drawn in separately). At the metering point 23 it is possible with advantage to add the crosslinker. For this purpose it is advantageous to lower the temperature of the melt, in order to lower the reactivity of the crosslinker and thereby to increase the processing life (temperature in segment $T_4$ low, advantageously low in the segment $T_3$ as well).

By means of a heatable hose 24b or a similar connecting section and a melt pump 24a or another conveying unit, the polymer melt is conveyed into a third assembly 3, such as a further mixing assembly, for example, such as a twin-screw extruder, and is fed into this assembly 3 at position 33. At the metering point 34, for example, the accelerant component is added. The design of the twin-screw extruder is advantageously such that it can be used as a degassing apparatus. Thus, for example, at the point shown, the entire mixture can be freed from all gas inclusions in a vacuum dome V at a pressure of 175 mbar or less. After the vacuum zone on the screw there is a blister B (a throttle point in the extrusion chamber, formed in particular as a circulating gap, such as an annular gap, for example, which serves, in particular, for adjusting the pressure of the melt processed in the extruder), which allows a build-up of pressure in the segment S that follows. Through appropriate control of the extruder speed and of the conveying unit downstream of the extruder, such as a melt pump 37a, for example, a pressure of 8 bar or more is built up in the segment S between blister B and melt pump 37a. In this segment S, at a metering point 35, the microballoon mixture (microballoons embedded into a liquid) is introduced, and is incorporated homogeneously into the polymer composition in the extruder.

The resultant melt mixture is transferred by means of the conveying unit (melt pump 37a and a connecting section 37b, such as a hose, for example) into a die 5. On departure from the die 5, in other words after a drop in pressure, the incorporated microballoons undergo expansion, thereby forming a foamed polymer composition, more particularly a foamed carrier layer S, which is subsequently shaped, being shaped, for example, as a web by means of a roll calender 4.

Furthermore, all of the chemical and physical foaming methods familiar to the skilled person may be used for converting the acrylate that forms the layer of the acrylate-based foam carrier (S) into a foam. Here, however, it should be ensured that the acrylate forming the layer of the acrylate-based foam carrier (S) remains thermally crosslinkable where necessary.

In a further aspect, the present invention relates to a method for producing the multilayer products of the invention, which comprises
(i) providing the herein-described layer of the acrylate-based foam carrier (S) having a top side and a bottom side; and
(ii) applying the herein-described multiphase polymer composition (P) to the top side and/or bottom side of the foam carrier (S).

Step (i) of the method of the invention here preferably comprises the following steps:
(a) providing one or more acrylates and alkyl acrylates which are polymerizable by means of free or controlled radical polymerization;
(b) polymerizing the acrylates and alkyl acrylates provided in method step (a), to form the herein-described polyacrylate; and
(c) converting the resulting polyacrylate into the herein-described polyacrylate foam, preferably foaming the resulting polyacrylate to form the polyacrylate foam, more preferably crosslinking and foaming or foaming and crosslinking the polyacrylate to form a crosslinked polyacrylate foam; and
(d) shaping the polyacrylate foam into a layer of the herein-described foam carrier (S).

In view of the herein-described suitability of the multiphase polymer composition (P) for the adhesive bonding of articles, more particularly for the adhesive bonding of articles having low-energy surfaces, the present invention further relates to an adhesive tape comprising the multilayer product of the invention, and also to the use of the multilayer product for adhesive bonding of articles, more particularly for adhesive bonding of surfaces with low energy.

The multilayer products of the invention are particularly suitable for the adhesive bonding of different materials and components such as emblems, mouldings made of plastic (e.g. bumpers) and rubber seals on the bodywork of motor vehicles. Bonding in this case, in particular, is also possible only after a step of bodywork coating with an LSE varnish, thereby giving the surface of the bodywork the properties of low-energy materials.

In the text below, the invention is illustrated in more detail with reference to specific examples.

EXAMPLES

Measurement Methods (General):
K Value (According to Fikentscher) (Method A1):
The K value is a measure of the average molecule size in high-polymer compounds. For the measurement, one per cent strength (1 g/100 mL) toluenic polymer solutions were prepared, and their kinematic viscosities were determined using a Vogel-Ossag viscometer. Following standardization to the viscosity of toluene, the relative viscosity is obtained, and can be used to calculate the K value according to Fikentscher (*Polymer* 1967, 8, 381 ff.)

Gel Permeation Chromatography GPC (Method A2):
The figures in this specification for the weight-average molecular weight $M_w$, and the polydispersity PD relate to the determination by gel permeation chromatography. The determination takes place on 100 µL samples subjected to clarifying filtration (sample concentration 4 g/L). The eluent used is tetrahydrofuran with 0.1 vol % of trifluoroacetic acid. Measurement takes place at 25° C. The preliminary column used is a PSS-SDV column, 5µ, $10^3$ Å, ID 8.0 mm×50 mm. Separation takes place using the columns PSS-SDV, 5µ, $10^3$ Å and also $10^5$ Å and $10^6$ Å, each of ID 8.0 mm×300 mm (columns from Polymer Standards Service; detection using Shodex RI71 differential refractometer). The flow rate is 1.0 mL per minute. Calibration takes place against PMMA standards (polymethyl methacrylate calibration).

Solids Content (Method A3):
The solids content is a measure of the fraction of unevaporable constituents in a polymer solution. It is determined gravimetrically, with the solution being weighed, then the vaporizable fractions being evaporated off in a drying cabinet at 120° C. for 2 hours, and the residue weighed again.

Static Glass Transition Temperature $T_g$ (Method A4):
The static glass transition temperature is determined by dynamic scanning calorimetry in accordance with DIN 53765. The figures given for the glass transition temperature $T_g$ relate to the glass transformation temperature value $T_g$ according to DIN 53765:1994-03, unless indicated otherwise specifically.

Density Determination by Pycnometer (Method A5a):
The principle of the measurement is based on the displacement of the liquid located within the pycnometer. First, the empty pycnometer or the pycnometer filled with liquid is weighed, and then the body to be measured is placed into the vessel.

The density of the body is calculated from the differences in weight:
Let
$m_0$ be the mass of the empty pycnometer,
$m_1$ be the mass of the pycnometer filled with water,
$m_2$ be the mass of the pycnometer with the solid body,
$m_3$ be the mass of the pycnometer with the solid body, filled up with water,
$\rho_W$ be the density of the water at the corresponding temperature,
$\rho_F$ be the density of the solid body.
The density of the solid body is then given by:

$$\rho_F = \frac{(m_2 - m_0)}{(m_1 - m_0) - (m_3 - m_2)} \cdot \rho_W$$

One triplicate determination is carried out for each specimen. It should be noted that this method gives the unadjusted density (in the case of porous solid bodies, in the present case a foam, the density based on the volume including the pore spaces).

Quick Method for Density Determination from the Coatweight and the Layer Thickness (Method A5b):

The weight per unit volume or density p of the applied layer is determined via the ratio of the weight per unit area to the respective film thickness:

$$\rho = \frac{m}{V} = \frac{MA}{d} \quad [\rho] = \frac{[kg]}{[m^2] \cdot [m]} = \left[\frac{kg}{m^3}\right]$$

MA=coatweight/weight per unit area (excluding liner weight) in [kg/m$^2$]

d=layer thickness (excluding liner thickness) in [m]

This method as well gives the unadjusted density.

This density determination is suitable in particular for determining the total density of finished products, including multi-layer products.

Measurement Methods (PSAs Especially):

180° Bond Strength Test (Method H1):

A strip 20 mm wide of an acrylate PSA applied to polyester as a layer was applied to a steel plate which beforehand had been washed twice with acetone and once with isopropanol. The pressure-sensitive adhesive strip was pressed onto the substrate twice with an applied pressure corresponding to a weight of 2 kg. The adhesive tape was then immediately removed from the substrate with a velocity of 300 mm/min and at an angle of 180°. All measurements were conducted at room temperature.

The results are reported in N/cm and have been averaged from three measurements. In the same way, determinations were made of the bond strength to polyethylene (PE) and varnish. The varnish used—for examples measured by Method H2 as well—in each case was the Uregloss® colourless varnish (product no. FF79-0060 0900) from BASF.

90° Bond Strength to Steel—Open and Lined Sides (Method H2):

The bond strength to steel is determined under test conditions of 23° C.+/−1° C. temperature and 50%+/−5% relative atmospheric humidity. The specimens were cut to a width of 20 mm and adhered to a steel plate. Prior to the measurement, the steel plate is cleaned and conditioned. This is done by first wiping the plate with acetone and then leaving it to lie in the air for 5 minutes so that the solvent can evaporate. The side of the three-layer assembly facing away from the test substrate was then lined with a 50 µm aluminium foil, to prevent the specimen stretching in the course of the measurement. After that, the test specimen was rolled onto the steel substrate. For this purpose, a 2 kg roller was passed five times back and forth over the tape with a rolling speed of 10 m/min. Immediately after rolling, the steel plate was inserted into a special mount which allows the specimen to be peeled off vertically upwards at an angle of 90°. Bond strength measurement was carried out using a tensile tester from Zwick. When the lined side is applied to the steel plate, the open side of the three-layer assembly is first laminated to the 50 µm aluminium foil, the release material is removed and the assembly is adhered to the steel plate, rolled analogously, and subjected to measurement.

The results of measurement for both sides, open and lined, are reported in N/cm and have been averaged from three measurements.

Holding Power (PSA on PET Film, Method H3):

A strip of the adhesive tape 13 mm wide and more than 20 mm long (30 mm for example) was applied to a smooth steel surface which had been cleaned three times with acetone and once with isopropanol. The bonding area was 20 mm×13 mm (length×width), with the adhesive tape overhanging the test plate (for example by 10 mm in accordance with above-stated length of 30 mm). The adhesive tape was then pressed onto the steel support four times with an applied pressure corresponding to a weight of 2 kg. This sample was suspended vertically, so that the projecting end of the adhesive tape points downwards.

At room temperature a weight of 1 kg was affixed to the projecting end of the adhesive tape. Measurement is conducted under standard conditions (23° C.+/−1° C., 55%+/−5% atmospheric humidity) and at 70° C. in a heating cabinet, the sample being loaded with a weight of 0.5 kg for this measurement.

The holding powers measured (times which elapse before complete detachment of the adhesive tape from the substrate; measurement discontinued after 10 000 minutes) are reported in minutes and correspond to the average of three measurements.

Holding Power—Open and Lined Sides (Adhesive Tape Articles, Method H4):

Preparation of specimens was carried out under test conditions of 23° C.+/−1° C. temperature and 50%+/−5% relative atmospheric humidity. The test specimen was cut to 13 mm and adhered to a steel plate. The bonding area is 20 mm×13 mm (length×width). Prior to the measurement the steel plate was cleaned and conditioned. This is done by first wiping the plate with acetone and then leaving it to lie in the air for 5 minutes to allow the solvent to evaporate. After bonding had been performed, the open side was reinforced with a 50 µm aluminium foil and a 2 kg roller was passed twice back and forth over the assembly. A belt loop was then placed on the projecting end of the three-layer assembly. The system was then suspended from a suitable apparatus and subjected to a load of 10 N. The suspension apparatus is of a type such that the weight subjects the sample to load at an angle of 179°+/−1°. This ensures that the three-layer assembly cannot peel from the bottom edge of the plate. The holding power measured, the time between the specimen being suspended and its fall, is reported in minutes and corresponds to the average from three measurements. For the measurement of the lined side, the open side is first reinforced with the 50 µm aluminium foil, the release material is removed, and the specimen is adhered to the test plate in analogy to the description of the open side. The measurement is conducted under standard conditions (23° C., 55% humidity).

Dynamic Shear Strength (Method H5):

A square adhesive transfer tape with an edge length of 25 mm is bonded between two steel plates and pressed down for 1 minute at 0.9 kN (force P). After a storage time of 24 hours, the assembly is parted in a tensile testing machine from Zwick at 50 mm/min and at 23° C. and 50% relative humidity in such a way that the two steel plates are pulled apart from one another at an angle of 180°. The maximum force is determined in N/cm$^2$.

Chemical Resistance Particularly to 60/95 Spirit, Engine Oil and Diesel Fuel (Method H6):

Sample preparation and measurement are as for Method H1. The specimen, already bonded, is placed in the investigation solvent, which has been conditioned at 23° C., for 10 minutes. The specimen is then taken from the solvent bath and wiped down, and the residual solvent is evaporated over 10 minutes, after which the bond strength is measured by comparison with a sample of the same adhesive tape which had the same contact time with the substrate that was not kept in a solvent.

The table below contains the commercially available chemicals used in the examples described here.

| Chemical compound | Trade name | Manufacturer | CAS No. |
|---|---|---|---|
| 1,3-Butadiene, homopolymer, hydrogenated, hydroxy-terminated, monomethacrylate | L-1253 | Kuraray | 260057-97-4 |
| Isostearyl acrylate | ISTA | ISA Co., Ltd. | 93841-48-6 |
| 2,2'-Azobis(2-methylbutyronitrile) | Vazo ® 67 | DuPont | 13472-08-7 |
| Bis(4-tert-butylcyclohexyl)peroxydicarbonate | Perkadox ® 16 | Akzo Nobel | 15520-11-3 |
| Aluminium acetylacetonate | — | Sigma-Aldrich | 13963-57-0 |
| Liquid hydrocarbon resin ($C_5$-based) | Wingtack ® 10 | Cray Valley | 26813-14-9 |
| Hydrocarbon resin ($C_5$-based, low aromatics fraction, softening point (Ring & Ball) 94° C.) | Piccotac ® 1095-N | Eastman | — |
| Hydrogenated liquid polyisoprene | LIR-290 | Kuraray | 151789-04-7 |
| SBS (about 16 wt % diblock, block polystyrene content: 31 wt %) | Kraton ® D 1101 | Kraton Polymers | 9003-55-8 |
| SBS (about 76 wt % diblock, block polystyrene content: 31 wt %) | Kraton ® D 1118 E | Kraton Polymers | 9003-55-8 |
| Hydrocarbon resin ($C_5$- and $C_9$-based with low aromatics fraction, softening point (Ring & Ball) about 95° C.) | Escorez ™ 2203 | Exxon Mobil | 64742-16-1 |
| Naphthenic oil | Shellflex ® 371 | Shell | 64742-2-5 |
| 2,2'-Azobis(isobutyronitrile) (AIBN) | Vazo ® 64 | DuPont | 78-67-1 |
| 3,4-Epoxycyclohexylmethyl 3,4-epoxycyclohexanecarboxylate | Uvacure ® 1500 | Cytec Industries Inc. | 2386-87-0 |
| Resorcinol bis(diphenyl phosphate) | Reofos ® RDP | Chemtura | 57583-54-7 |
| Pentaerythritol tetraglycidyl ether | Polypox ® R16 | UPPC AG | 3126-63-4 |
| N'-(3-(Dimethylamino)propyl)-N,N-dimethyl-1,3-propanediamine | Jeffcat ® Z-130 | Huntsman | 6711-48-4 |
| Microballoons (MB) (Dry-unexpanded microspheres, diameter 9-15 μm, expansion initiation temperature 106-111° C., TMA density ≤25 kg/m³) | Expancel ® 051 DU 40 | Expancel Nobel Industries | |

I Preparation of the Comb Compolymers (A)—P 1 to P 4

Described below is the preparation of exemplary comb copolymers (A).

Example P 1

A 100 L glass reactor conventional for radical polymerizations was charged with 1.2 kg of acrylic acid (AA, 3%), 20.97 kg of 2-ethylhexyl acrylate (EHA, 52.43%), 9.83 kg of butyl acrylate (BA, 24.57%), 4.0 kg of isobornyl acrylate (IBOA, 10%), 4.0 kg of macromer L-1253 (10%) and 20.8 kg of acetone/60/95 spirit (1:1). After nitrogen gas had been passed through the reactor for 45 minutes, with stirring, the reactor was heated up to 58° C. and 0.8 kg of Vazo® 67 was added. Thereafter the external heating bath was heated to 75° C. and the reaction was carried out constantly at this external temperature. After a reaction time of 1 hour, a further 0.8 kg of Vazo® 67 was added. Over a period of 5 hours (counted from the last addition of Vazo® 67), dilution took place at hourly intervals with 5.0 to 10.0 kg, depending on the rise in viscosity, of 60/95 spirit, and so adequate mixing was ensured. In order to reduce the level of residual monomers, additions of 1.5 kg each time of bis(4-tert-butylcyclohexyl) peroxydicarbonate were made after 6 hours and after 7 hours from the start of reaction (i.e. counting from the first addition of Vazo® 67), with dilution in between with 15 kg of 60/95 spirit. After a reaction time of 24 hours, the reaction was discontinued by cooling to room temperature.

Comb Popolymers (A)—P 2 to P 4

Comb copolymers P 2 to P 4 were prepared as for Example P 1. The percentage mass figures of each of the monomers used are listed in Table 1. Ethyl acetate was used both for polymerization of hybrid polymer P 3 and for all dilutions carried out during the preparation of P 3.

TABLE 1

Hybrid polymers P2 to P4

| | AA | BA | EHA | IBOA | ISTA | L-1253 |
|---|---|---|---|---|---|---|
| P 2 | 3.0% | 26.9% | 60.1% | — | — | 10.0% |
| P 3 | 5.0% | 25.5% | 54.5% | — | — | 15.0% |
| P 4 | 5.0% | 25.5% | 54.5% | — | 5.0% | 10.0% |

Table 2 shows the molar mass distributions as measured by GPC and the static glass transition temperatures as measured by DSC for hybrid polymers P 1 to P 4.

TABLE 2

Polymer data for hybrid polymers P 1 to P 4

| | $M_n$ [g/mol][a] | $M_w$ [g/mol][a] | PD [—][a] | stat. $Tg_1$ [° C.][b] | stat. $Tg_2$ [° C.][b] |
|---|---|---|---|---|---|
| P 1 | 64 800 | 1 570 000 | 24.23 | −67.7 | −39.6 |
| P 2 | 64 900 | 1 550 000 | 23.88 | −67.7 | −50.5 |
| P 3 | 68 500 | 1 620 000 | 23.65 | −67.7 | −49.4 |
| P 4 | 58 100 | 1 620 000 | 27.88 | −53.4 | −49.9 |

[a]Measured by Method A2.
[b]Measured by Method A4.

II Preparation of Multiphase Polymer Compositions (P)—PSA 1 to PSA 4 and of Comparative Compositions VPSA 5 to VPSA 7

Described below is the preparation of exemplary multiphase polymer compositions (P). All examples PSA 1 to PSA 4 and also comparative examples VPSA 5 to VPSA 7 were prepared in solution, then coated onto a 36 μm PET film (Kemafoil HPH 100, Covema) or onto a siliconized release film for lamination to a layer of an acrylate-based foam carrier, and subsequently dried. The coatweight was 50 g/m² in each case.

The multiphase polymer compositions PSA 1 to PSA 4 and also comparative example VPSA 5, based on an acrylate-hydrocarbon hybrid polymer, were prepared in solution from the hybrid polymers P 1 to P 4. For this purpose, they were diluted to a solids content of 30% with spirit, 0.3 wt % of the aluminum acetylacetonate crosslinker, and the resin or resins according to Table 3, were added to the solution, followed by coating and subsequent drying. For coating and drying an apparatus was used in which a drying tunnel with different temperature zones was located after a comma bar (coating rate 2.5 m/min, drying tunnel 15 m, temperatures—zone 1: 40° C., zone 2: 70° C., zone 3: 95° C., zone 4: 105° C.).

The resin fractions and glass transition temperatures of the acrylate phase and hydrocarbon phase of the multiphase polymer composition (P) are listed in Table 3; the technical adhesive data for examples PSA 1 to PSA 4 and also comparative examples VPSA 5 to VPSA 7 are listed in Table 4.

butyl acrylate, 13.0 kg of 2-ethylhexyl acrylate and 26.7 kg of acetone/ 60/95 spirit (1:1). After nitrogen gas had been passed through the reactor for 45 minutes with stirring, the reactor was heated up to 58° C. and 30 g of AIBN were added. After that the external heating bath was heated to 75° C. and the reaction was carried out constantly at this external temperature. After a reaction time of 1 hour a further 30 g of AIBN were added. After 4 hours and 8 hours, dilution took place with 10 kg of acetone/60/95 spirit (1:1) mixture each time. In order to reduce the level of residual initiators, 90 g portions of bis(4-tert-butylcyclohexyl) peroxydicarbonate were added after 8 hours and again after 10 hours. The reaction was terminated after a time of 24 hours by cooling to room temperature. The resulting polyacrylate had a K value of 49.3, an average molecular weight of $M_w$=1 058 800 g/mol, a polydispersity of D ($M_w/M_n$)=15.1 and a static glass transition temperature of Tg=−15.3° C. The polyacrylate was subsequently blended with 0.2 wt % of Uvacure 1500, diluted to a solids content of 30% with acetone, and then coated from solution onto a siliconized release film (50 μm polyester) or onto a 23 μm, etched PET film. (Coating rate 2.5 m/min, drying tunnel 15 m, temperatures—zone 1: 40° C., zone 2: 70° C., zone 3: 95° C., zone 4: 105° C.). The coatweight was 50 g/m².

TABLE 3

Hybrid examples PSA 1 to PSA 4 and comparative example VPSA 5

|  | Polymer | Piccotac 1095-N [%] | Wingtack 10 [%] | LIR-290 [%] | Hydrocarbon fraction, total [%] | Hydrocarbon fraction, on macromer [%] | Solid HC resin fraction, on total resin [%] | stat. Tg HC phase [° C.][b] | stat. Tg Ac phase [° C.][b] | □Tg [K] |
|---|---|---|---|---|---|---|---|---|---|---|
| PSA 1 | P1 | 30.0 | 16.0 | 10.0 | 56.0 | 92.7 | 65.2 | 1 | −39.6 | 40.6 |
| PSA 2 | P2 | 27.9 | 23.2 | — | 51.1 | 91.4 | 54.6 | 6.3 | −50.5 | 56.8 |
| PSA 3 | P3 | 30.3 | 23.0 | — | 53.3 | 86.9 | 56.8 | 6.4 | −49.4 | 55.8 |
| PSA 4 | P4 | 30.3 | 23.0 | — | 53.3 | 86.9 | 56.8 | 6.4 | −49.9 | 56.3 |
| VPSA 5 | P1 | 16.3 | 30.0 | — | 46.3 | 88.4 | 35.2 | −6.0 | −39.9 | 33.9 |

[b] Measured by Method A4.

Comparative Example

Crosslinked Synthetic Rubber PSA (VPSA 6)

For comparative example PSA 5, 33.0 kg of Kraton D 1101, 17 kg of Kraton D 1118, 48.0 kg of Escorez 2203 hydrocarbon resin and 2.0 kg of Shellflex 371 oil were dissolved in 100 kg of toluene. After coating out (film thickness: 50 g/m²) and drying, the material was additionally crosslinked by means of electron beam curing (EBC). This electron beam curing was done using a unit from Electron Crosslinking AB (Halmstad, Sweden) and using an accelerator voltage of 220 keV and also a dose of 35 kGy with a belt speed of 3 m/min.

Comparative Example

Polyacrylate PSA (VPSA 7)

A 100 L glass reactor conventional for radical polymerizations was charged with 2.0 kg of acrylic acid, 25.0 kg of

TABLE 4

Technical adhesive data for multiphase polymer compositions (P) - PSA 1 to PSA 4 and comparative examples VPSA 5 to VPSA 7

| Ex. | BS instant. steel [N/cm] | BS instant. FF-79 [N/cm] | BS instant. PE [N/cm] | HP RT [min] |
|---|---|---|---|---|
| PSA 1 | 9.65 | 6.2 | 6.12 | >10 000 |
| PSA 2 | 12.79 | 10.52 | 5.89 | >10 000 |
| PSA 3 | 15.74 | 15.39 | 7.56 | 7200 (K) |
| PSA 4 | 15.36 | 14.99 | 7.87 | 7108 (K) |
| VPSA 5 | 8.63 | 6.7 | 4.42 | 3682 (A) |
| VPAS 6 | 3.8 | 1.2 | 0.5 | >10 000 |
| VPSA 7 | 4.4 | 1.3 | 1.0 | >10 000 |

The bond strength (BS) measurements, instantaneous, took place by Method H1; the holding power (HP) time measurements at room temperature took place by Method H3.

A: adhesive fraction,
K: cohesive fracture.

III Preparation of Exemplary Polyacrylates for the Layer of the Acrylate-based Foam Carrier (S)—VT 1 and VT 2

Described below is the preparation of the starting polymers. The polymers investigated are prepared conventionally in solution via a free radical polymerization.

Polyacrylate VT 1

A reactor conventional for radical polymerizations was charged with 54.4 kg of 2-ethylhexyl acrylate, 20.0 kg of methyl acrylate, 5.6 kg of acrylic acid and 53.3 kg of acetone/isopropanol (94:6). After nitrogen gas had been passed through the reactor for 45 minutes, with stirring, the reactor was heated up to 58° C. and 40 g of 2,2'-azobis(2-methylbutyronitrile) were added. Thereafter the external heating bath was heated to 75° C. and the reaction was carried out constantly at this external temperature. After 1 hour a further 40 g of 2,2'-azobis(2-methylbutyronitrile) were added and after 4 hours dilution took place with 10 kg of acetone/isopropanol mixture (94:6). After 5 hours and again after 7 hours, re-initiation was carried out with 120 g of bis(4-tert-butylcyclohexyl) peroxydicarbonate. After a reaction time of 22 hours, cooling took place to room temperature. The polyacrylate has a K value of 58.8, a solids content of 55.9%, an average molecular weight of $M_w$=746 000 g/mol, polydispersity ($M_w/M_n$)=8.9 and a static glass transition temperature of $T_g$=−11.0° C.

Polyacrylate VT 2

A reactor conventional for radical polymerizations was charged with 30 kg of 2-ethylhexyl acrylate, 67 kg of n-butyl acrylate, 3 kg of acrylic acid and 66 kg of acetone/isopropanol (96:4). After nitrogen gas had been passed through the reactor for 45 minutes, with stirring, the reactor was heated up to 58° C. and 50 g of 2,2'-azobis(2-methylbutyronitrile) were added. Thereafter the external heating bath was heated to 75° C. and the reaction was carried out constantly at this external temperature. After 1 hour a further 50 g of 2,2'-azobis(2-methylbutyronitrile) were added and after 4 hours dilution took place with 20 kg of acetone/isopropanol mixture (96:4).

After 5 hours and again after 7 hours, re-initiation was carried out with 150 g of bis(4-tert-butylcyclohexyl) peroxydicarbonate, and dilution with 23 kg of acetone/isopropanol mixture (96:4). After a reaction time of 22 hours the polymerization was discontinued by cooling to room temperature. The polyacrylate has a K value of 75.1, a solids content of 50.2%, an average molecular weight of $M_w$=1 480 000 g/mol, polydispersity ($M_w/M_n$)=16.1 and a static glass transition temperature of $T_g$=−38.5° C.

IV Production of Microballoon Mixtures

The microballoons are placed in a container which has been charged with Reofos® RDP as liquid component (dispersant) as reported in the individual examples. Stirring then took place in a planetary stirrer mechanism from PC-LABORSYSTEM under a pressure of 5 mbar with a rotary speed of 600 rpm for 30 minutes.

Process 1: Concentration/Preparation of the Polyacrylate Melt

The acrylate copolymers (base polymers VT 1 and VT 2) are very largely freed from the solvent by means of a single-screw extruder (feeder extruder 1, Troester GmbH & Co KG, Germany) (residual solvent content 0.3 wt %; cf. the individual examples). The parameters given here by way of example are those for the concentration of polyacrylate VT 1. The screw speed was 150 rpm, the motor current 15 A, and a throughput of 60.0 kg liquid/h was realized. For concentration, a vacuum was applied at three different domes. The reduced pressures were, respectively, between 20 mbar and 300 mbar. The exit temperature of the concentrated hotmelt is approximately 115° C. The solids content after this concentration step was 99.8%.

Process 2: Preparation of Foamed Composition

Foaming takes place in an experimental unit which corresponds to the illustration in FIG. 2.

The corresponding polyacrylate (VT 1 and VT 2) is melted as per Process 1 in a feeder extruder 1 and is conveyed by this extruder, in the form of a polymer melt, via a heatable hose 11 into a planetary roller extruder 2 (PRE) from Entex (Bochum) (more particularly a PRE with four modules heatable independently of one another, $T_1$, $T_2$, $T_3$ and $T_4$, was used). Via the metering port 22, there exists the possibility of supplying additional additives or fillers, such as colour pastes, for example. At point 23, the crosslinker is added. All of the components are mixed to form a homogeneous polymer melt.

By means of a melt pump 24a and a heatable hose 24b, the polymer melt is transferred into a twin-screw extruder 3 (from Berstorff) (feed position 33). At position 34, the accelerator component is added. Subsequently the mixture as a whole is freed from all of the gas inclusions in a vacuum dome V at a pressure of 175 mbar (for the criterion for freedom from gas, see above). Downstream of the vacuum zone, on the screw, there is a blister B, which allows a build-up of pressure in the subsequent segment S. Through appropriate control of the extruder speed and of the melt pump 37a, a pressure of greater than 8 bar is built up in the segment S between blister B and melt pump 37a, and at the metering point 35 the microballoon mixture (microballoons embedded into the dispersing assistant in accordance with the details given for the experimental series) is added, and is incorporated homogeneously into the premix by means of a mixing element. The resultant melt mixture is transferred into a die 5.

Following departure from the die 5, in other words after a drop in pressure, the incorporated microballoons undergo expansion, and the drop in pressure results in a low-shear, more particularly no-shear, cooling of the polymer composition. This produces an acrylate-based foam which subsequently, to form a layer of an acrylate-based foam carrier (S), is coated between two release materials, more particularly between a release material which can be used again after being removed (in-process liner), and is shaped to a web by means of a roll calender 4.

TABLE 5

Viscoelastic acrylate-based foam carriers VT 1 and VT 2

| | | | Example | |
|---|---|---|---|---|
| | | | VT 1 | VT 2 |
| Components | Polyacrylate | [wt %] | 97.8 | 97.1 |
| | Expancel 051 DU 40 | | 1.5 | 2.0 |

TABLE 5-continued

| Viscoelastic acrylate-based foam carriers VT 1 and VT 2 | | | | | |
|---|---|---|---|---|---|
| | | | | Example | |
| | | | | VT 1 | VT 2 |
| | Polypox R16 | | | 0.139 | 0.222 |
| | Jeffcat Z130 | | | 0.144 | 0.154 |
| | Reofos RDP | | | 0.41 | 0.48 |
| Construction | Thickness | | [μm] | 1092 | 1124 |
| | Density (I.2) | | [kg/m³] | 749 | 670 |
| Performance | HP [min] | RT 20 N | [min] | 1874 | 5232 |
| | | 70° C. 10 N | | 1282 | 2954 |
| | Bond strength to steel [N/cm] | instantaneous | [N/cm] | 24.5 A | 21.0 A |
| | | 3 d | | 33.4 A | 64.3 K |
| | | 14 d | | 35.1 A | 65.2 K |

Density: Method A5a,
bond strength: Method H2,
HP (holding power): Method H4

V Multilayer Products MT 1 to MT 8; Comparative Examples VMT 9 to VMT 11

In all examples, both sides of the acrylate-based foam carriers were coated with the same PSA. The coatweight of the respective multiphase polymer composition on the viscoelastic carrier is in all cases 50 g/m².

In order to improve the anchoring of the PSA on the shaped, viscoelastic carrier layer, not only the PSA but also the viscoelastic carrier are corona-treated prior to the laminating step (corona unit from Vitaphone, Denmark, 100 W·min/m²). After the three-layer assembly has been produced, this treatment leads to improved chemical attachment to the viscoelastic carrier layer. The web speed when travelling through the laminating unit is 30 m/min. Prior to lamination, any anti-adhesive support, more particularly an in-process liner, is removed, and the completed three-layer product is wound up together with a remaining, second anti-adhesive support.

Presented below are specific examples of the inventive multilayer products (MT) and also non-inventive comparative products (VMT), without any intention to impose unnecessary restriction on the invention by the choice of the specified formulations, configurations, operational parameters and/or product designs.

TABLE 6

Examples MT 1 to MT 8 and comparative examples VMT 9 to VMT 11

| Ex. | PSA | Viscoel. carrier | BS to steel [N/cm] | BS to PE [N/cm] | BS to varnish FF-79 [N/cm] | HP 10 N, RT [min] | HP 10 N, 70° C. [min] | Dyn. shear strength [N/cm²] |
|---|---|---|---|---|---|---|---|---|
| MT 1 | PSA 1 | VT 1 | 50 f.s. | 48 | 50 f.s. | >10 000 | >10 000 | 60 |
| MT 2 | PSA 1 | VT 2 | 50 f.s. | 49 | 50 f.s. | >10 000 | 1200 | 63 |
| MT 3 | PSA 2 | VT 1 | 50 f.s. | 47 | 42 | >10 000 | >10 000 | 44 |
| MT 4 | PSA 2 | VT 2 | 50 f.s. | 48 | 50 f.s. | >10 000 | 5200 | 54 |
| MT 5 | PSA 3 | VT 1 | 50 f.s. | 48 | 50 f.s. | >10 000 | >10 000 | 65 |
| MT 6 | PSA 3 | VT 2 | 50 f.s. | 50 f.s. | 50 f.s. | >10 000 | >10 000 | 68 |
| MT 7 | PSA 4 | VT 1 | 50 f.s. | 42 | 42 | >10 000 | >10 000 | 60 |
| MT 8 | PSA 4 | VT 2 | 50 f.s. | 46 | 45 | >10 000 | 2200 | 44 |
| VMT 9 | VPSA 5 | VT 2 | 50 f.s. | 34 | 44 | >10 000 | 5500 | 52 |
| VMT 10 | VPSA 6 | VT 2 | 41 | 23 | 41 | 7500 (A) | 380 (A) | 65 |
| VMT 11 | VPSA 7 | VT 2 | 25 | 10 | 23 | >10 000 | 2200 | 41 |

Bond strength (BS): Method H2,
HP (holding power): Method H4,
dynamic shear strength: Method H5,
A: Adhesive fracture
f.s.: foam split (cohesive splitting of the viscoelastic carrier)

VI Peel Increase Behaviour of the Three-Layer Products MT 6 and Comparative Examples VMT 9 to VMT 11

TABLE 7

Peel increase behaviour

| Ex. | BS to PE instan. [N/cm] | BS to PE 20 min [N/cm] | BS to PE 1 d [N/cm] | BS to PE 3 d [N/cm] | BS to FF-79 instan. [N/cm] | BS to FF-79 20 min [N/cm] | BS to FF-79 1 d [N/cm] | BS to FF-79 3 d [N/cm] |
|---|---|---|---|---|---|---|---|---|
| MT 6 | 50 f.s. | 50 f.s. | 50 f.s. | 50 f.s. | 50 f.s. | 50 f.s. | 50 f.s. | 50 f.s. |
| VMT 9 | 34 | 38 | 39 | 39 | 44 | 49 | 50 f.s. | 50 f.s. |
| VMT 10 | 23 | 30 | 30 | 30 | 41 | 50 f.s. | 50 f.s. | 50 f.s. |
| VMT 11 | 10 | 18 | 26 | 35 | 23 | 35 | 42 | 79 |

Bond strength (BS): Method H2,
f.s.: foam split (cohesive splitting of the viscoelastic carrier)

VII Stability of the Three-Layer Products MT 6 and Also of Comparative Examples VMT 9 to VMT 11 Towards 60/95 Spirit

TABLE 8

Spirit stability

| Ex. | BS steel without spirit storage [N/cm] | BS steel after spirit storage [N/cm] | Bond strength reduction [%] | Spirit stability |
|---|---|---|---|---|
| MT 6 | 50 f.s. | 44 | 12.0 | very good |
| VMT 9 | 50 f.s. | 38 | 24.0 | good |
| VMT 10 | 41 | 2 | 95.1 | poor |
| VMT 11 | 25 | 22 | 12.0 | very good |

Measurement method H5,
f.s.: foam split (cohesive splitting in viscoelastic carrier)

Preferred Embodiments of the Invention

Summarized below are particularly preferred embodiments of the invention, in the form of embodiments EMB 1 to EMB 31:

EMB 1. Multilayer product comprising
at least one layer of an acrylate-based foam carrier (S); and
a multiphase polymer composition (P) applied to this layer;
the multiphase polymer composition (P) comprising:
a comb copolymer (A) which is obtainable by polymerization of at least one (meth)acrylate monomer in the presence of at least one macromer selected from the group consisting of polymerizable ethylene-butylene, ethylene-propylene, ethylene-butylene-propylene and isobutylene macromers, and which forms a continuous acrylate phase and a discontinuous hydrocarbon phase Kw;
and at least one hydrocarbon component (B) which is soluble in the hydrocarbon phase Kw of the comb copolymer (A) and comprises at least one plasticizer resin and at least one solid resin;
the multiphase polymer composition (P) having a continuous acrylate phase with a static glass transition temperature Tg(Ac), measured by the DSC method, and a discontinuous hydrocarbon phase Kw1, comprising the hydrocarbon component (B) and having a static glass transition temperature Tg(Kw1), measured by the DSC method, where Tg(Kw1) is higher than Tg(Ac) by 35 to 60 kelvins, preferably by 40 to 60 kelvins, more preferably by 45 to 60 kelvins.

EMB 2. Multilayer product according to EMB 1, the acrylate-based foam carrier (S) being a viscoelastic foam carrier.

EMB 3. Multilayer product according to either of preceding EMB 1 and EMB 2, the acrylate forming the layer of the foam carrier (S) being a polyacrylate which is obtainable by free or controlled radical polymerization of one or more acrylates and alkyl acrylates.

EMB 4. Multilayer product according to any of preceding EMB 1 to EMB 3, the acrylate forming the layer of the foam carrier (S) being a crosslinked polyacrylate, preferably a thermally crosslinked polyacrylate.

EMB 5. Multilayer product according to any of preceding EMB 1 to EMB 4, the acrylate forming the layer of the foam carrier (S) being a polyacrylate which is obtainable by polymerization of monomers consisting of monomers of the following groups (a1) to (a3):

(a1) 70 to 100 wt %, based on all monomers participating in the polymerization, of acrylic esters and/or methacrylic esters and/or a free acid as per structural formula (I):

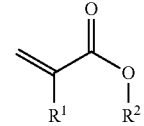

where $R^1$ is H or $CH_3$ and $R^2$ represents H or $C_1$-$C_{14}$ alkyl;

(a2) 0 to 30 wt %, based on all monomers participating in the polymerization, of olefinically unsaturated monomers which are copolymerizable with the monomers of group (a1) and have at least one functional group; and (a3) optionally further acrylates and/or methacrylates and/or olefinically unsaturated monomers, preferably in a fraction of 0 to 5 wt %, based on all monomers participating in the polymerization, which are copolymerizable with the monomers of group (a1) and have at least one functional group which leads by means of a coupling reagent to covalent crosslinking.

EMB 6. Multilayer product according to EMB 5, the monomers of group (a1) being selected from methyl acrylate, methyl methacrylate, ethyl acrylate, ethyl methacrylate, propyl acrylate, propyl methacrylate, n-butyl acrylate, n-butyl methacrylate, n-pentyl acrylate, n-hexyl acrylate, n-hexyl methacrylate, n-heptyl acrylate, n-octyl acrylate, n-nonyl acrylate, lauryl acrylate, stearyl acrylate, stearyl methacrylate, behenyl acrylate and their branched isomers such as, for example, 2-ethylhexyl acrylate, and also mixtures thereof;

and/or the monomers of group (a2) being selected from maleic anhydride, itaconic anhydride, glycidyl methacrylate, benzyl acrylate, benzyl methacrylate, phenyl acrylate, phenyl methacrylate, tert-butylphenyl acrylate, tert-butylphenyl methacrylate, phenoxyethyl acrylate, phenoxyethyl methacrylate, 2-butoxyethyl methacrylate, 2-butoxyethyl acrylate, dimethylaminoethyl methacrylate, dimethylaminoethyl acrylate, diethylaminoethyl methacrylate, diethylaminoethyl acrylate and tetrahydrofurfuryl acrylate, and also mixtures thereof;

and/or the monomers of group (a3) being selected from hydroxyethyl acrylate, 3-hydroxypropyl acrylate, hydroxyethyl methacrylate, 3-hydroxypropyl methacrylate, 4-hydroxybutyl acrylate, 4-hydroxybutyl methacrylate, allyl alcohol, itaconic acid, acrylamide and cyanoethyl methacrylate, cyanoethyl acrylate, 6-hydroxyhexyl methacrylate, N-tert-butylacrylamide, N-methylolmethacrylamide, N-(butoxymethyl)methacrylamide, N-methylolacrylamide, N-(ethoxymethyl) acrylamide, N-isopropylacrylamide, vinylacetic acid, β-acryloyloxpropionic acid, trichloroacrylic acid, fumaric acid, crotonic acid, aconitic acid, dimethylacrylic acid and 4-vinylbenzoic acid, and also mixtures thereof.

EMB 7. Multilayer product according to any of preceding EMB 1 to EMB 6, the multilayer product being an adhesive tape.

EMB 8. Multilayer product according to any of EMB 5 to EMB 7, the monomers of groups (a1) to (a3) being selected such that the static glass transition temperature, Tg(A), measured by the DSC method, of the acrylate forming the layer of the foam carrier (S) is 15° C. or less.

EMB 9. Multilayer product according to any of preceding EMB 1 to EMB 8, the layer of the foam carrier (S) comprising at least one tackifying resin in addition to the acrylate forming this layer.

EMB 10. Multilayer product according to any of preceding EMB 1 to EMB 9, the layer of the foam carrier (S) being foamed through use of microballoons.

EMB 11. Multilayer product according to any of preceding EMB 1 to EMB 10, the layer of the foam carrier (S) having a layer thickness of 0.3 to 5 mm.

EMB 12. Multilayer product according to any of preceding EMB 1 to EMB 11, the static glass transition temperature of the discontinuous hydrocarbon phase Kw1 within the polymer composition (P), Tg(Kw1), being in a range from −5 to +15° C., preferably 0 to +10° C.

EMB 13. Multilayer product according to any of preceding EMB 1 to EMB 12, the static glass transition temperature of the continuous acrylate phase within the polymer composition (P), Tg(Ac), being below −10° C., preferably in a range from −60 to −20° C., more preferably in a range from −50 to −30° C.

EMB 14. Multilayer product according to any of preceding EMB 1 to EMB 13, the macromer having a number-average molecular weight Mn, measured by the GPC method, of 1000 to 500 000 g/mol, preferably of 2000 to 30 000.

EMB 15. Multilayer product according to any of preceding EMB 1 to EMB 14, the fraction of the comb copolymer (A) making up 30-64 weight percent, preferably 45-60 weight percent, based on the total weight of the comb copolymer (A) and of the at least one hydrocarbon component (B) within the polymer composition (P).

EMB 16. Multilayer product according to any of preceding EMB 1 to EMB 15, the macromer units within the comb copolymer (A) making up 5-25 weight percent, preferably 10-15 weight percent, based on the total weight of the comb copolymer (A).

EMB 17. Multilayer product according to any of preceding EMB 1 to EMB 16, the at least one (meth)acrylate monomer which can be used for preparing the comb copolymer (A) comprising at least one monomer which is selected from the group consisting of acrylic acid, methacrylic acid, 2-ethylhexyl acrylate, methyl acrylate, butyl acrylate, isobornyl acrylate, stearyl acrylate, isostearyl acrylate, amyl acrylate, isooctyl acrylate, decyl acrylate, hydroxyethyl acrylate, hydroxyethyl methacrylate and 4-hydroxybutyl acrylate, preferably from the group consisting of acrylic acid, methacrylic acid, 2-ethylhexyl acrylate, methyl acrylate, butyl acrylate, isobornyl acrylate, stearyl acrylate, isostearyl acrylate, amyl acrylate, isooctyl acrylate and decyl acrylate.

EMB 18. Multilayer product according to any of preceding EMB 1 to EMB 17, the polymerization of the at least one (meth)acrylate monomer which can be used for preparing the comb copolymer (A) being carried out in the presence of at least one further copolymerizable monomer, this at least one further copolymerizable monomer being selected from the group consisting of itaconic acid, itaconic anhydride, maleic acid, maleic anhydride, vinyl acetate, vinyl butyrate, vinyl propionate, vinyl isobutyrate, vinyl valerate, vinyl versatates, N-vinylpyrrolidone and N-vinylcaprolactam.

EMB 19. Multilayer product according to any of preceding EMB 1 to EMB 18, the comb copolymer (A) being obtainable by polymerization of a comonomer mixture comprising acrylic acid, butyl acrylate and 2-ethylhexyl acrylate in the presence of the at least one macromer.

EMB 20. Multilayer product according to any of preceding EMB 1 to EMB 19, the polymerization of the at least one (meth)acrylate monomer which can be used for preparing the comb copolymer (A) being carried out in the presence of at least one further non-polyolefinic macromer, the further non-polyolefinic macromer being preferably selected from the group of the polymethacrylates, polystyrenes, polydimethylsiloxanes, polyethylene oxides and polypropylene oxides.

EMB 21. Multilayer product according to any of preceding EMB 1 to EMB 20, the plasticizer resin and the solid resin of the hydrocarbon component (B) of the polymer composition (P) having a number-average molecular weight Mn of 1000 g/mol or less, measured by the GPC method.

EMB 22. Multilayer product according to any of preceding EMB 1 to EMB 21, the hydrocarbon component (B) of the polymer composition (P) consisting of a plasticizer resin and a solid resin.

EMB 23. Multilayer product according to any of preceding EMB 1 to EMB 22, the polymer composition (P) further comprising a further hydrocarbon compound (C), whose number-average molecular weight Mn, measured by the GPC method, is more than 1000 g/mol, and the polymer composition preferably having a static glass transition temperature Tg(C) which lies between the glass transition temperatures of the continuous acrylate phase, Tg(Ac), and of the discontinuous hydrocarbon phase, Tg(Kw1).

EMB 24. Multilayer product according to any of preceding EMB 1 to EMB 23, the polymer composition (P) further comprising at least one additive selected from the group consisting of plasticizers, oils and resins soluble in the acrylate phase of the comb copolymer, preferably rosin esters and/or terpene-phenolic resins.

EMB 25. Multilayer product according to any of preceding EMB 1 to EMB 24, the total amount of the hydrocarbon component (B) and, if present, of the hydrocarbon compound (C) of the polymer composition (P) being 80 weight percent or more, based on the total fraction of the discontinuous hydrocarbon phase within the polymer composition (P).

EMB 26. Multilayer product according to any of preceding EMB 1 to EMB 25, the polymer composition (P) being a pressure-sensitive adhesive.

EMB 27. Multilayer product according to any of preceding EMB 1 to EMB 26, the multiphase polymer composition (P) applied to the layer of the foam carrier (S) being applied in the form of a layer having a weight per unit area of 40 to 100 g/m².

EMB 28. Method for producing a multilayer product according to any of preceding EMB 1 to EMB 27, comprising the steps of:
(i) providing a layer of an acrylate-based foam carrier (S) having a top side and a bottom side; and
(ii) applying a multiphase polymer composition (P) to the top side and/or bottom side of the foam carrier (S), the multiphase polymer composition (P) comprising:
a comb copolymer (A) which is obtainable by polymerization of at least one (meth)acrylate monomer in the presence of at least one macromer selected from the group consisting of polymerizable ethylene-butylene, ethylene-propylene, ethylene-butylene-propylene and isobutylene macromers, and which forms a continuous acrylate phase and a discontinuous hydrocarbon phase Kw;
and at least one hydrocarbon component (B) which is soluble in the hydrocarbon phase Kw of the comb copolymer (A) and comprises at least one plasticizer resin and at least one solid resin;
the multiphase polymer composition (P) having a continuous acrylate phase with a static glass transition temperature Tg(Ac), measured by the DSC method, and a discontinuous hydrocarbon phase Kw1, comprising the hydrocarbon component (B) and having a static glass transition temperature Tg(Kw1), measured by the DSC method, where Tg(Kw1) is higher than Tg(Ac) by 35 to 60 kelvins, preferably by 40 to 60 kelvins, more preferably by 45 to 60 kelvins.

EMB 29. Method according to EMB 28, step (i) comprising the following method steps:
(a) providing one or more acrylates and alkyl acrylates which are polymerizable by means of free or controlled radical polymerization;
(b) polymerizing the acrylates and alkyl acrylates provided in method step (a), to form a polyacrylate;
(c) converting the resulting polyacrylate into a polyacrylate foam; and
(d) shaping the polyacrylate foam into a layer of a foam carrier (S).

EMB 30. Adhesive tape comprising a multilayer product according to any of EMB 1 to EMB 27.

EMB 31. Use of the multilayer product according to any of EMB 1 to EMB 27 for adhesive bonding of articles.

The invention claimed is:

1. Multilayer product comprising
at least one layer of an acrylate-based foam carrier (S); and
a multiphase polymer composition (P) applied to this layer;
the multiphase polymer composition (P) comprising:
a comb copolymer (A) obtained by polymerization of at least one (meth)acrylate monomer in the presence of at least one macromer selected from the group consisting of polymerizable ethylene-butylene, ethylene-propylene, ethylene-butylene-propylene and isobutylene macromers, and which forms a continuous acrylate phase and a discontinuous hydrocarbon phase Kw;
a hydrocarbon component (B) which is soluble in the hydrocarbon phase Kw of the comb copolymer (A) and comprises at least one plasticizer resin and at least one solid resin;
the multiphase polymer composition (P) having a continuous acrylate phase with a static glass transition temperature Tg(Ac), measured by the DSC method, and a discontinuous hydrocarbon phase Kw1, comprising the hydrocarbon component (B) and having a static glass transition temperature Tg(Kw1), measured by the DSC method, where Tg(Kw1) is higher than Tg(Ac) by 35 to 60 kelvins.

2. Multilayer product according to claim 1, wherein the acrylate-based foam carrier (S) is a viscoelastic foam carrier.

3. Multilayer product according to claim 1, wherein, the acrylate forming the layer of the foam carrier (S) is a polyacrylate obtained by free or controlled radical polymerization of one or more acrylates and alkyl acrylates.

4. Multilayer product according to claim 1, wherein, the acrylate forming the layer of the foam carrier (S) is a crosslinked polyacrylate.

5. Multilayer product according to claim 1, wherein, the acrylate forming the layer of the foam carrier (S) is a polyacrylate obtained by polymerization of monomers consisting of monomers of the following groups (a1) to (a3):
(a1) 70 to 100 wt % of acrylic esters and/or methacrylic esters and/or a free acid as per structural formula (I):

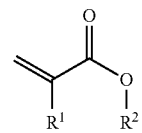

where $R^1$ is H or $CH_3$ and $R^2$ represents H or $C_1$-$C_{14}$ alkyl;
(a2) 0 to 30 wt % of olefinically unsaturated monomers which are copolymerizable with the monomers of group (a1) and have at least one functional group; and
(a3) optionally further acrylates and/or methacrylates and/or olefinically unsaturated monomers, which are copolymerizable with the monomers of group (a1) and have at least one functional group which leads by means of a coupling reagent to covalent crosslinking.

6. Multilayer product according to claim 5, wherein the monomers of group (a1) are selected from the group consisting of methyl acrylate, methyl methacrylate, ethyl acrylate, ethyl methacrylate, propyl acrylate, propyl methacrylate, n-butyl acrylate, n-butyl methacrylate, n-pentyl acrylate, n-hexyl acrylate, n-hexyl methacrylate, n-heptyl acrylate, n-octyl acrylate, n-nonyl acrylate, lauryl acrylate, stearyl acrylate, stearyl methacrylate, behenyl acrylate and their branched isomers and mixtures thereof;
and/or the monomers of group (a2) are selected from the group consisting of maleic anhydride, itaconic anhydride, glycidyl methacrylate, benzyl acrylate, benzyl methacrylate, phenyl acrylate, phenyl methacrylate, tert-butylphenyl acrylate, tert-butylphenyl methacrylate, phenoxyethyl acrylate, phenoxyethyl methacrylate, 2-butoxyethyl methacrylate, 2-butoxyethyl acrylate, dimethylaminoethyl methacrylate, dimethylaminoethyl acrylate, diethylaminoethyl methacrylate, diethylaminoethyl acrylate, tetrahydrofurfuryl acrylate, and mixtures thereof;
and/or the monomers of group (a3) are selected from the group consisting of hydroxyethyl acrylate, 3-hydroxypropyl acrylate, hydroxyethyl methacrylate, 3-hydroxypropyl methacrylate, 4-hydroxybutyl acrylate, 4-hydroxybutyl methacrylate, allyl alcohol, itaconic acid, acrylamide and cyanoethyl methacrylate, cyanoethyl acrylate, 6-hydroxyhexyl methacrylate, N-tert-butylacrylamide, N-methylolmethacrylamide, N-(butoxymethyl)methacrylamide, N-methylolacrylamide, N-(ethoxymethyl)acrylamide, N-isopropylacrylamide, vinylacetic acid, β-acryloyloxypropionic acid, trichloroacrylic acid, fumaric acid, crotonic acid, aconitic acid, dimethylacrylic acid, 4-vinylbenzoic acid, and mixtures thereof.

7. Multilayer product according to claim 1, wherein, the multilayer product is an adhesive tape; and/or the layer of the foam carrier (S) is foamed through use of microballoons.

8. Multilayer product according to claim 1, wherein, the static glass transition temperature of the discontinuous hydrocarbon phase within the polymer composition (P), Tg(Kw1), is in a range from −5 to +15° C., and/or the static glass transition temperature of the continuous acrylate phase within the polymer composition (P), Tg(Ac), is below −10° C.

9. Multilayer product according to claim 1, wherein, the fraction of the comb copolymer (A) makes up 30-64 weight percent, based on the total weight of the comb copolymer (A) and of the at least one hydrocarbon component (B) within the polymer composition (P); and/or the macromer units within the comb copolymer (A) make up 5-25 weight percent, based on the total weight of the comb copolymer (A).

10. Multilayer product according to claim 1, wherein, the at least one (meth)acrylate monomer which can be used for preparing the comb copolymer (A) comprises at least one monomer selected from the group consisting of acrylic acid, methacrylic acid, 2-ethylhexyl acrylate, methyl acrylate, butyl acrylate, isobornyl acrylate, stearyl acrylate, isostearyl acrylate, amyl acrylate, isooctyl acrylate, decyl acrylate, hydroxyethyl acrylate, hydroxyethyl methacrylate and 4-hydroxybutyl acrylate, preferably from the group consisting of acrylic acid, methacrylic acid, 2-ethylhexyl acrylate, methyl acrylate, butyl acrylate, isobornyl acrylate, stearyl acrylate, isostearyl acrylate, amyl acrylate, isooctyl acrylate and decyl acrylate.

11. Multilayer product according to claim 1, wherein, the polymerization of the at least one (meth)acrylate monomer which can be used for preparing the comb copolymer (A) is carried out in the presence of at least one further copolymerizable monomer, this at least one further copolymerizable monomer being selected from the group consisting of itaconic acid, itaconic anhydride, maleic acid, maleic anhydride, vinyl acetate, vinyl butyrate, vinyl propionate, vinyl isobutyrate, vinyl valerate, vinyl versatates, N-vinylpyrrolidone and N-vinylcaprolactam.

12. Multilayer product according to claim 1, wherein, the plasticizer resin and the solid resin of the hydrocarbon component (B) have a number-average molecular weight Mn of 1000 g/mol or less, measured by the GPC method.

13. Multilayer product according to claim 12, wherein the polymer composition (P) further comprises a further hydrocarbon compound (C), whose number-average molecular weight Mn, measured by the GPC method, is more than 1000 g/mol, and the polymer composition optionally has a static glass transition temperature Tg(C) which lies between the glass transition temperatures of the continuous acrylate phase, Tg(Ac), and of the discontinuous hydrocarbon phase, Tg(Kw1).

14. Multilayer product according to claim 1, wherein, the polymer composition (P) is a pressure-sensitive adhesive; and/or the multiphase polymer composition (P) applied to the layer of the foam carrier (S) is applied in the form of a layer having a weight per unit area of 40 to 100 g/m².

15. Method for producing a multilayer product according to claim 1, comprising the steps of:
(i) providing a layer of an acrylate-based foam carrier (S) having a top side and a bottom side; and
(ii) applying a multiphase polymer composition (P) to the top side and/or bottom side of the foam carrier (S),
the multiphase polymer composition (P) comprising:
a comb copolymer (A) obtained by polymerization of at least one (meth)acrylate monomer in the presence of at least one macromer selected from the group consisting of polymerizable ethylene-butylene, ethylene-propylene, ethylene-butylene-propylene and isobutylene macromers, and which forms a continuous acrylate phase and a discontinuous hydrocarbon phase Kw;
a component (B) which is soluble in the hydrocarbon phase Kw of the comb copolymer (A) and comprises a plasticizer resin and a solid resin;
the multiphase polymer composition (P) having a continuous acrylate phase with a static glass transition temperature Tg(Ac), measured by the DSC method, and a discontinuous hydrocarbon phase Kw1, comprising the hydrocarbon component (B) and having a static glass transition temperature Tg(Kw1), measured by the DSC method, where Tg(Kw1) is higher than Tg(Ac) by 35 to 60 kelvins.

16. Adhesive tape comprising a multilayer product of claim 1.

17. A method for adhesive bonding of articles, wherein said articles are bonded with a multilayer product of claim 1.

* * * * *